United States Patent [19]

Shurtleff

[11] Patent Number: 5,795,462

[45] Date of Patent: *Aug. 18, 1998

[54] APPARATUS AND METHOD FOR RECLAIMING USEFUL OIL PRODUCTS FROM WASTE OIL

[75] Inventor: Edward Calton Shurtleff, Pennfield, Canada

[73] Assignee: Patent Holdings Ltd., Grand Turk, Turks/Caicos Islands

[*] Notice: The term of this patent shall not extend beyond the expiration date of Pat. No. 5,286,349.

[21] Appl. No.: 829,526

[22] Filed: Mar. 28, 1997

Related U.S. Application Data

[63] Continuation of Ser. No. 199,201, filed as PCT/CA92/00240, Jun. 10, 1992 published as WO92/22624, Dec. 23, 1992, abandoned, which is a continuation-in-part of Ser. No. 712,775, Jun. 10, 1991, Pat. No. 5,286,349, which is a continuation-in-part of Ser. No. 246,834, Sep. 20, 1988, abandoned.

[51] Int. Cl.$^6$ .................................. C10M 175/00
[52] U.S. Cl. .................. 208/182; 208/184; 196/46.1; 196/116; 196/132; 196/135; 196/138; 196/141
[58] Field of Search .............. 196/46.1, 48, 116, 196/132, 135, 138, 141; 137/428; 210/128, 129, 180; 208/101, 182, 184; 203/2; 159/47.3

[56] References Cited

U.S. PATENT DOCUMENTS

| 101,365 | 3/1870 | Hill et al. ................................ 196/111 |
| 135,673 | 2/1873 | Tait et al. ................................ 196/111 |

(List continued on next page.)

FOREIGN PATENT DOCUMENTS

| 163082 | 5/1955 | Australia . |
| 259521 | 3/1988 | Czechoslovakia . |
| 360500 | 3/1990 | European Pat. Off. . |
| 2434865 | 3/1980 | France . |
| 247880 | 4/1981 | France . |
| 712748 | 10/1941 | Germany . |
| 2900342 | 6/1980 | Germany . |
| 3121246 | 12/1982 | Germany . |
| 166105 | 8/1944 | Japan . |
| 48-102104 | 12/1973 | Japan . |
| 52-139106 | 11/1977 | Japan . |
| 55-164291 | 12/1980 | Japan . |
| 63-15888 | 1/1985 | Japan . |
| 187082 | 6/1978 | New Zealand . |
| 184277 | 8/1980 | New Zealand . |
| 90/09426 | 8/1990 | WIPO . |
| WO/9009426 | 8/1990 | WIPO . |

OTHER PUBLICATIONS

"Manufacture of Lubricating Oils by Hydrocracking", Eighth World Petroleum Congress, Proceedings, vol. 4, Manufacturing, 1971, by J.B. Gilbert and J. Walker.

*Chemistry and Technology of Crude Oil*, ed. SNTL (Bratislava, 1963), p. 12.

*Technical Encyclopaedia*, ed. SNTL (Praha 1, 1981) p. 360–1.

(List continued on next page.)

Primary Examiner—Nina Bhat
Attorney, Agent, or Firm—Bereskin & Parr

[57] ABSTRACT

Apparatus for reclaiming a useful oil product has an evaporation chamber, including an inlet for the waste oil, and an outlet for the vaporized oil, as a useful oil product. Burners are provided for heating the evaporation chamber to vaporized oil from the waste oil. A pump and float arrangement are provided for monitoring the level of waste oil in the evaporation chamber, and for pumping additional waste oil into the chamber to maintain the waste oil at a desired level. Continuous operation of the apparatus results in a build up of solid waters, e.g. heavy metals, in the chamber. After a period of operation, the burners are turned off, and the chamber opened, to enable the solid residue to be removed from the chamber. The vaporized oil can be condensed and collected.

33 Claims, 23 Drawing Sheets

U.S. PATENT DOCUMENTS

| | | | |
|---|---|---|---|
| 877,605 | 1/1908 | Sone . | |
| 1,310,874 | 7/1919 | Reilly | 196/116 |
| 1,451,739 | 4/1923 | Mayes | 196/111 |
| 1,459,515 | 6/1923 | Penniman | 196/132 |
| 1,464,246 | 8/1923 | Freeman | 196/111 |
| 1,546,055 | 7/1925 | Wilson et al. | 196/111 |
| 1,650,887 | 11/1927 | de Florez | 196/132 |
| 1,709,230 | 4/1929 | Potter . | |
| 1,831,875 | 11/1931 | Moreton . | |
| 1,876,035 | 9/1932 | Tennent . | |
| 2,012,695 | 8/1935 | Schillaber | 196/46 |
| 2,702,268 | 2/1955 | Egger et al. . | |
| 2,792,058 | 5/1957 | Thomas et al. | 158/5 |
| 3,717,569 | 2/1973 | McAllister et al. | 208/92 |
| 3,923,643 | 12/1975 | Lewis et al. | 208/179 |
| 3,930,988 | 1/1976 | Johnson | 208/182 |
| 3,954,602 | 5/1976 | Troesch et al. | 208/179 |
| 4,021,333 | 5/1977 | Habiby et al. | 208/179 |
| 4,071,438 | 1/1978 | O'Blasny | 208/180 |
| 4,101,414 | 7/1978 | Kim et al. | 208/18 |
| 4,151,072 | 4/1979 | Nowack et al. | 208/182 |
| 4,233,140 | 11/1980 | Antonelli et al. | 208/180 |
| 4,247,389 | 1/1981 | Johnson et al. | 208/181 |
| 4,287,049 | 9/1981 | Tabler et al. | 208/180 |
| 4,381,992 | 5/1983 | Wood et al. | 202/185 |
| 4,392,820 | 7/1983 | Niederholtmeyer | 431/11 |
| 4,431,523 | 2/1984 | Tabler et al. | 208/182 |
| 4,431,524 | 2/1984 | Norman | 208/183 |
| 4,452,671 | 6/1984 | Oakes . | |
| 4,457,805 | 7/1984 | Pastor . | |
| 4,460,328 | 7/1984 | Niederholtmeyer . | |
| 4,512,878 | 4/1985 | Reid et al. | 208/179 |
| 4,666,587 | 5/1987 | Martin | 208/184 |
| 4,778,588 | 10/1988 | Brandes et al. | 208/213 |
| 4,816,138 | 3/1989 | Visser et al. | 208/179 |
| 4,824,556 | 4/1989 | Brandes et al. | 208/143 |
| 4,831,004 | 5/1989 | Brandes et al. | 502/220 |
| 5,188,742 | 2/1993 | Shurtleff | 210/774 |
| 5,248,410 | 9/1993 | Clausen et al. | 208/131 |
| 5,271,808 | 12/1993 | Shurtleff | 196/46 |
| 5,286,349 | 2/1994 | Shurtleff | 196/46 |
| 5,362,381 | 11/1994 | Brown et al. | 208/179 |
| 5,382,328 | 1/1995 | Drespa et al. | 202/235 |
| 5,397,459 | 3/1995 | Butler | 208/179 |

OTHER PUBLICATIONS

Newspaper Article: Undated — name of publication unknown, entitled Boundless potential for invention which turns waste oil into fuel by Reed Haley, Staff Writer; inventor's picture on sheet captioned "Liquid Gold — Ed Shurtleff and his amazing mini refinery . . . ".

Newspaper Article: Handwritten name of publication "Telegraph Journal — Mar. 1, 1989" entitled His machine converts waste oil into usable diesel –type fuel; inventor's picture captioned Likes Results — Ed Shurtleff, inventor of a machine that turns waste oil into diesel–type fuel . . . .

Newspaper Article: Undated photocopies of two articles on one sheet: name of publication unknown, one entitled "Award–Winning Inventor Says Inventing Akin To Having A Baby" and Shurtleff Wins Award — both articles written by Sandy Morgan.

Newspaper Article: Undated article "Inventor's Refined Idea Is Making Fine Oil" by Mac Trueman, The Evening Times Globe, Saint John (New Brunswick) with inventor's picture captioned Ed Shurtleff with his mini–refinery . . . .

Newspaper Article: Publication and date unknown; article entitled "Waste Oil Refining Unit Approved for sale in United States Market", by Dennis Brooks, Correspondent, Picture of various people with caption A new machine that recycles used motor oils . . . .

Newspaper Article: The Brunswick Business Journal, Oct. 1990 entitled "The Innovators" by Eugene Wales; picture of inventor captioned Ed Shurtleff is an inventor stymied by red tape.

Article published in the Atlantic Business publication, May/Jun. 1989 entitled "Turning Garbage Into Gold" — Ed Shurtleff has built a machine . . . with two photos of Mr. Shurtleff captioned Ed Shurtleff shows off final . . . .

Newspaper Article: Saint Croix Courier, Tuesday, Nov. 13, 1990, entitled "Shurtleff saluted in House of Commons" by Barb Rayner.

*Perry's Chemical Engineer's Handbook*, 6th Ed., Figure 13–76, section 13–75.

*Greases & Special Oils*, edited by VEDA, Bratislava 1980, p. 92–93.

*Chemistry & Technology of Crude Oil*, Editor SNTL, Bratislava 1963, p. 270.

*Common Chemical Technology*, Praha 1981, p. 59.

Czech Certificate of Authorship 208, 333 Jun. 1982.

Czech Certificate of Authorship 198, 671 Nov. 1982.

Czech Certificate of Authorship 154, 304 Aug. 1974.

ASTM Standard D 975 –89, *Standard Specification for Diesel Fuel Oils*, Jun. 1989.

OCL Services Ltd., *Environmental Feasibility Study of the SX–302 Waste Oil Refiner*, 1991.

*Chemical's Handbook* Ch. 13, ed. Perry J.H (Hungarian Edition), McGraw Hill 1969; pp. 1157–1159, Fig. 13–45.

Sattler, Klaus; *Termikus elválasztási módszerek* (Thermal Methods of Separation), Ch. 2; Budapest 1983; pp. 92–165.

L'Institut Français du Petrole, *Le Pétrole: Raffinage et Génie Chimique* 2nd Ed.; Editions Technip: Paris, 1972; p. 995.

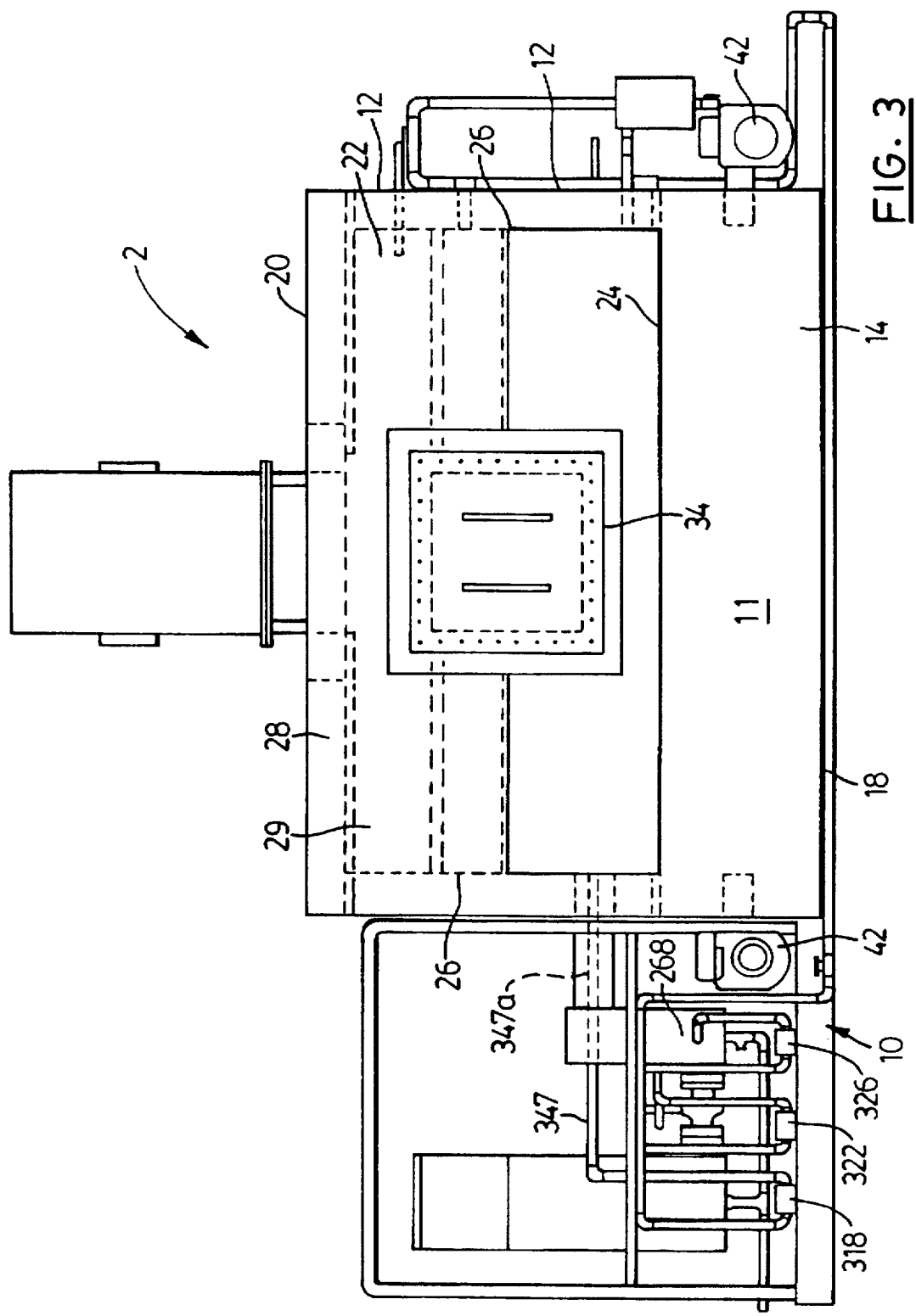

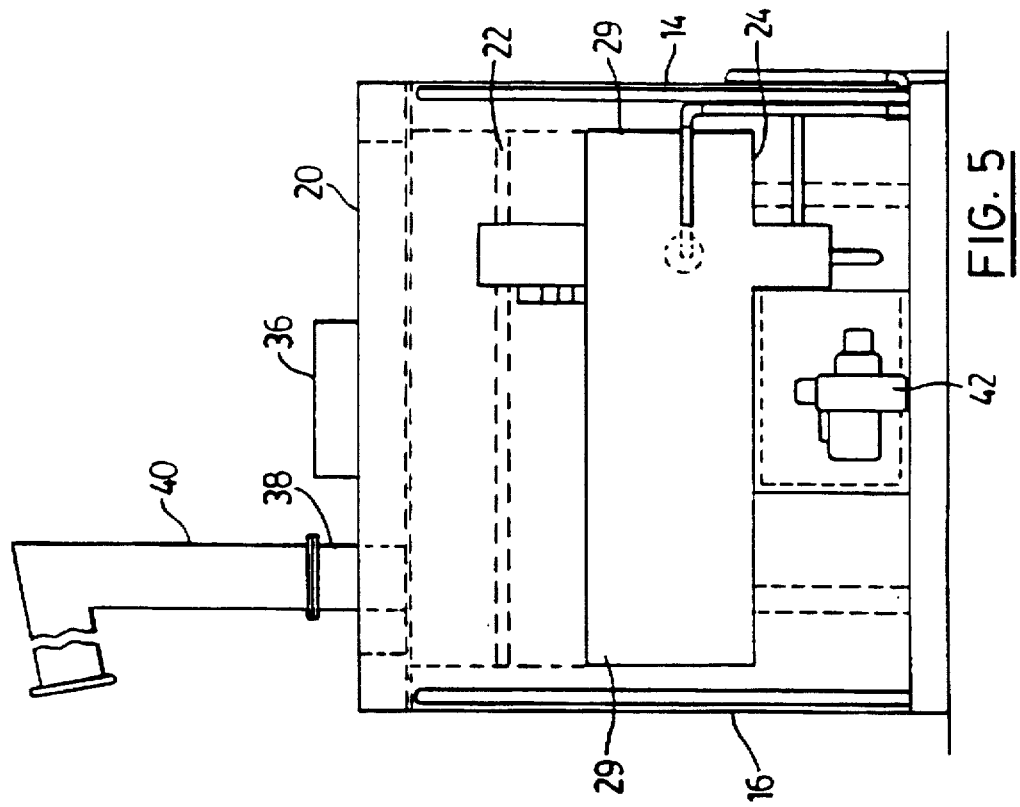
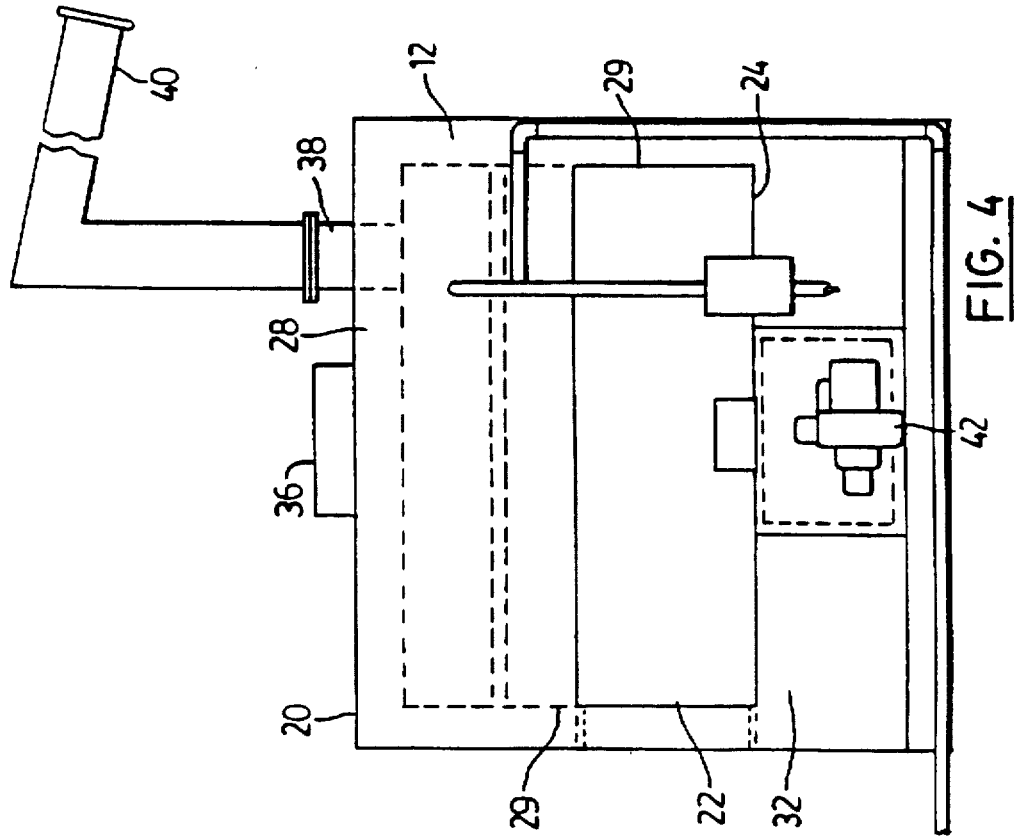

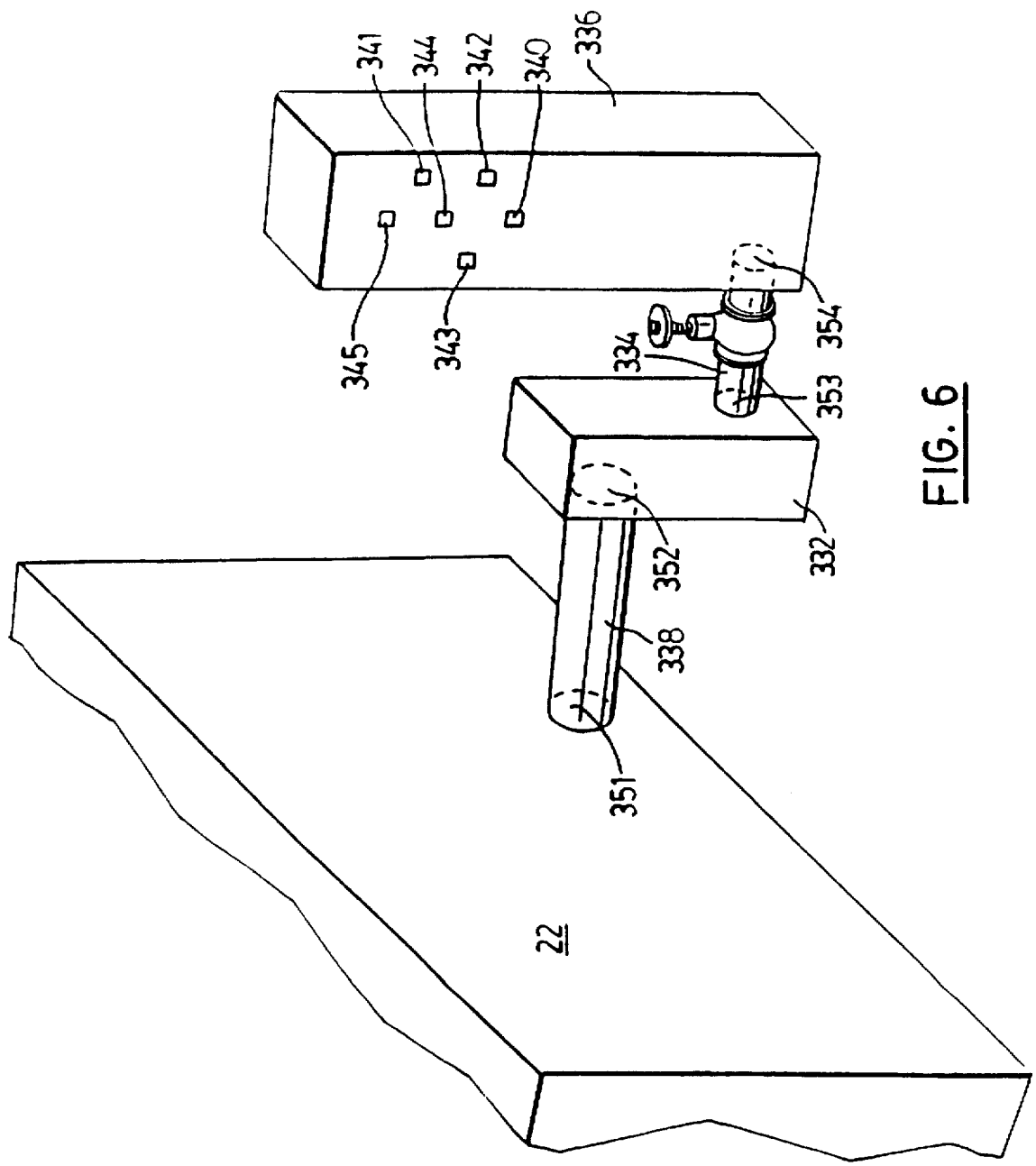

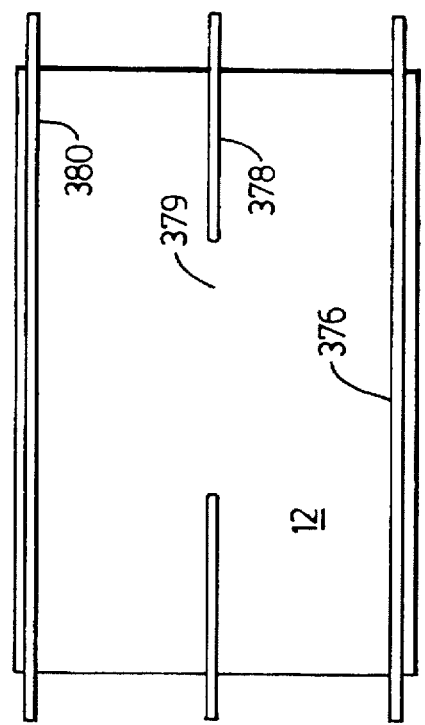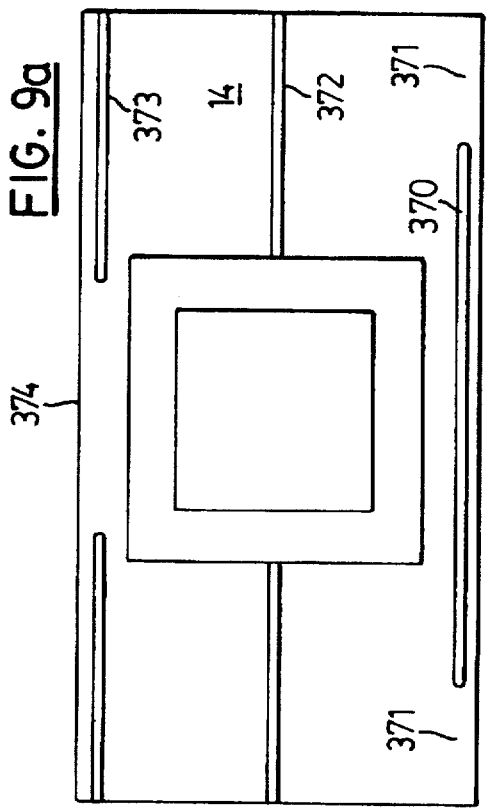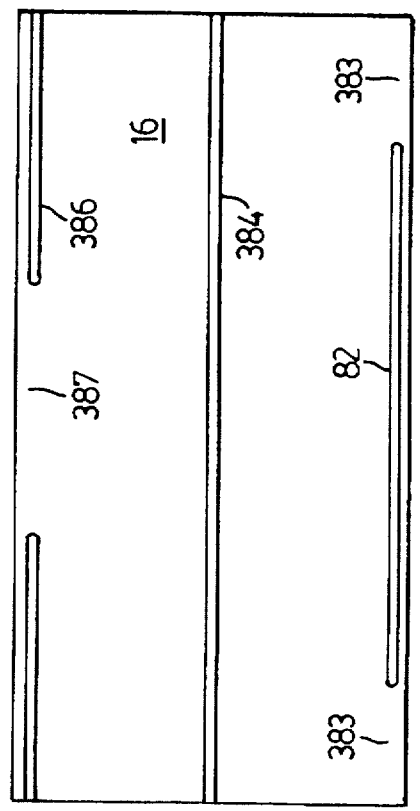

APPARATUS AND METHOD FOR RECLAIMING USEFUL OIL PRODUCTS FROM WASTE OIL

CROSS-REFERENCE TO RELATED APPLICATION

This application is a continuation of U.S. application Ser. No. 08/199,201, filed as PCT/CA92/00240, Jun. 10, 1992 published as WO92/22624, Dec. 23, 1992, now abondoned, which application is a Continuation-in-Part of my earlier application Ser. No. 07/712,775 filed Jun. 10, 1991, now U.S. Pat. No. 5,286,349 which is a continuation-in-part of Ser. No. 246,834 filed Sep. 20, 1988, now abondoned. Further, the contents of those earlier application Ser. Nos. 07/712,775 and 246,834 are hereby incorporated by reference.

FIELD OF THE INVENTION

This invention relates generally to an apparatus and a method for reclaiming waste oil, and more particularly relates to reclaiming waste oil from a sludge, i.e. a highly viscous material containing a relatively large amount of contaminants and particulate solids.

In this specification, the term "waste oil" encompasses any suitable oil, for example mineral oils which have been used as motor oil, or some other lubricating oil, or as hydraulic oil or in some other application. It is anticipated that these oils will have been derived from mineral oil, but they could be, for example, animal or vegetable oil, such as fish oil or oil discarded by restaurants, etc. The mineral oil could be plain crude oil. In use, such lubricating oils are usually changed periodically. The drained and recovered waste oil typically contain substantial amounts of contaminants, which may include dirt, metallic particles (including heavy metals, such and molybdenum, chromium, cadmium, vanadium, copper, etc.), oxides and salts, gasoline and gasoline additives (such as tetraethyl lead) as well detergents and performance additives. It may also be contaminated with water. Large quantities of such waste oil are produced in industrialized countries, and my earlier invention was directed to method and apparatus for recovering waste oil, so that it would be suitable for various uses. The contaminants in waste oil usually make it unsuitable for most uses. The term "waste oil" further includes an oil-based sludge such as that produced in the apparatus of my earlier invention described in application Ser. No. 246,834.

My earlier invention provided an apparatus in which the lighter hydrocarbons of the waste oil were volatized and then condensed. Also, whilst the exact mechanism within the apparatus was not fully understood, it is believed that some cracking or splitting of the hydrocarbons from longer to shorter chain molecules occur. Indeed, it is even possible that the contaminants present acted as a catalyst. It was discovered that starting with contaminated, waste lubricating oil, approximately 90% of this could be converted into a lighter oil, suitable for use as a diesel fuel.

The effect of the method or process of my earlier invention was to concentrate the contaminants in the remaining portion or fraction of the original waste oil, e.g. in 10% of the original waste oil. This in effect gives a sludge with a higher concentration of the original contaminants, and which itself poses a disposal problem. It is also to be realized that there are various industries which naturally produce similar sludge or sludge-like materials, which are primarily oil, usually mineral oil, but which are so contaminated with particulate solids etc. that they are too viscous to pass through the apparatus of my original invention.

In view of the high degree of contaminants in such sludges, it is highly desirable to provide some technique of disposing of them. Preferably, this should at the very least significantly reduce the volume of contaminated material for final disposal, and more preferably it should reduce the contaminated material to a form in which it could be more readily reprocessed itself or in a form suitable for disposal.

SUMMARY OF THE PRESENT INVENTION

In accordance with one aspect of the present invention, there is provided an apparatus for reclaiming a useful oil product from a waste oil, the apparatus comprising: an evaporation chamber, including an inlet for the waste oil, and an outlet for vaporized oil, as a useful oil product; heating means for heating the evaporation chamber to vaporize oil from the waste oil; level monitoring means for monitoring the level of the waste oil in the evaporation chamber and including a first switch means; pump means connected to the inlet of the evaporation chamber for pumping waste oil into the evaporation chamber, and connected to and controlled by the level monitoring means, to maintain the waste oil level in the evaporation chamber at a desired level; and a control circuit connected to and controlling the heating means and the pump means, wherein the first switch means is connected in the control circuit for controlling the pump means and for disabling the heating means if a desired oil level is not present in the evaporation chamber, and the control circuit includes a bake override switch means for overriding operation of the first switch means and enabling continued operation of the heating means in a bake mode with the waste oil below the desired level, thereby to enable vaporisation of substantially all residual waste oil in the evaporation chamber.

In accordance with another aspect of the present invention, there is provided a method of reclaiming a useful oil product from a waste oil, the method comprising the steps of: (1) heating the waste oil in an evaporation chamber, to vaporize oil therefrom, and recovering the vaporized oil as a useful oil product; (2) continuously supplying waste oil to the evaporation chamber, whereby the concentration of solid material in the evaporation chamber builds up to form a sludge in which the solids are concentrated; and (3) after a period of time heating the sludge in a bake mode, the sludge being heated to a temperature higher than in step (1) to vaporise substantially all residual waste oil, to leave a solid residue; (4) after residual waste oil has been vaporised, disposing of the solid residue.

For certain applications, particularly small uses, a batch operation could be employed. Instead of continuously supplying waste oil and providing floats to monitor the level, etc., a batch of waste oil would be heated in a vessel or chamber, to volatilise the hydrocarbons etc., which would be recovered as a useable fuel oil. This would leave a certain amount of solid contaminants. If desired, the chamber could be refilled and the process repeated. When desired, or as limited by the build of contaminants, the solid contaminants could be removed from the chamber.

For both the continuous or batch process, it is preferred for the oil to be condensed. More preferably, the oil is condensed in an adjacent condensation unit that generates a back pressure of around 0.5 p.s.i. above atmospheric, for example, in the range 0.42–0.46 p.s.i. above atmospheric pressure. It is believed that this pressure elevates the temperature sufficiently to cause a certain amount of cracking of the constituents of the oil, to give a recovered oil that is lighter than the oil present in the input sludge.

The apparatus and method are particularly intended for use with sludge generated by the apparatus of my earlier application Ser. No. 246.834. My earlier apparatus was capable of recovering about 90% of the volume of an original waste oil product, the other 10%, approximately, was left as a sludge, containing high level of contaminants, impurities and solids. The present apparatus and method enable the solid contaminants to be removed, comparable to that produced by my earlier invention. Effectively, the contaminants and solids are further concentrated into an even smaller volume, and, after a final high temperature baking step, are left as a cake-like residue. This can be readily dug out of the evaporation chamber.

Preferably, the waste oil is first put through the apparatus of the present invention, and is then passed through the apparatus of my earlier invention, which cracks the oil to produce a lighter fuel oil. This also considerably increases the throughput through that earlier apparatus.

As detailed below, the concentration of various metals etc. in this cake-like residue is very high, as compared to their concentration in the original waste oil product, and hence it becomes economically feasible to further process this solid residue, to recover the metals and other materials contained in it. Whilst the amount of solid residue produced is small, where large quantities of waste oil are being reprocessed through the apparatus of my earlier invention and the present apparatus, this could ultimately produce a steady flow of solid material which would justify reprocessing.

In the method of the present invention, the vaporized oil that is produced can either be condensed, or for certain applications left in the vaporized state. Thus, it could be combined with other apparatus, where vaporized oil is required, e.g. for combustion purposes.

BRIEF DESCRIPTION OF DRAWING FIGURES

For a better understanding of the present invention, and to show more clearly how it may be carried into effect, reference will now be made, by way of example, to the accompanying drawings which show a preferred embodiment of the apparatus and in which:

FIG. 3 is a front view of the apparatus;

FIG. 4 is a right side view of the apparatus;

FIG. 5 is a left side view of the apparatus;

FIG. 6 is a perspective view showing the arrangement of float and service tanks of the apparatus;

Figure 7A:
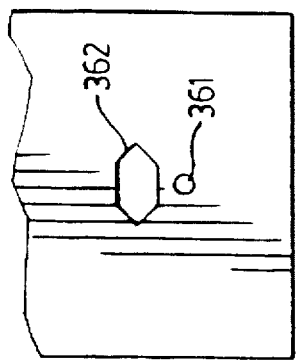
Figure 8:
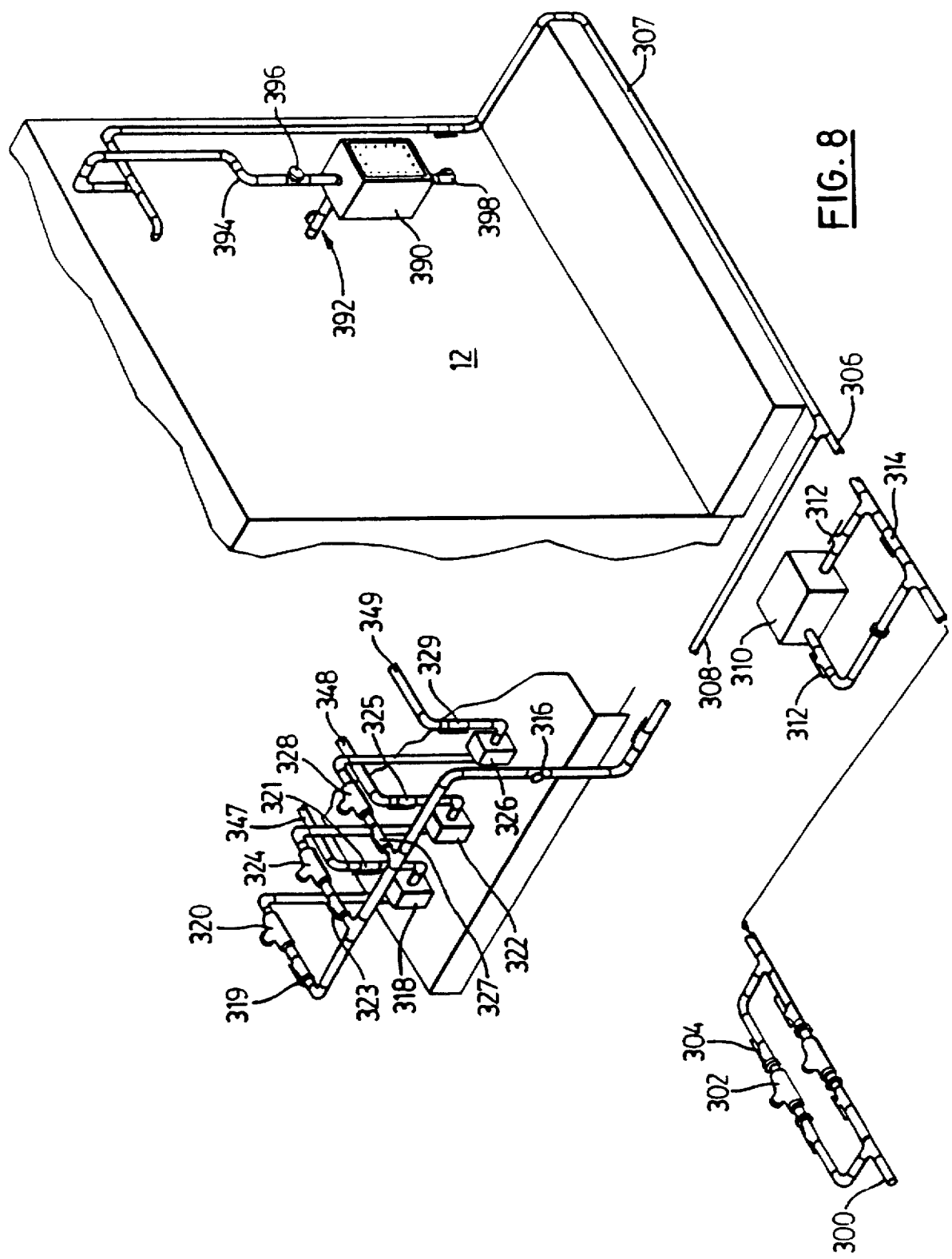
Figure 10:
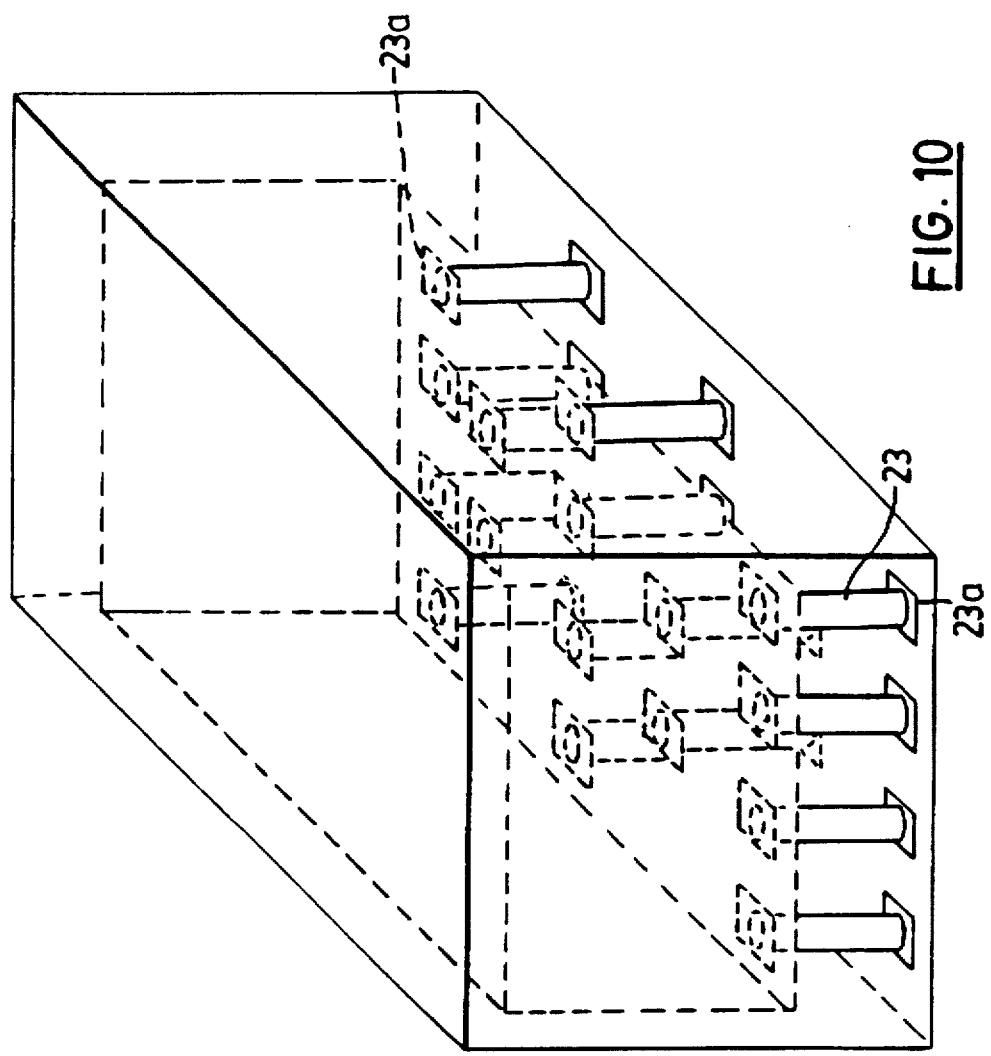
Figure 11A:
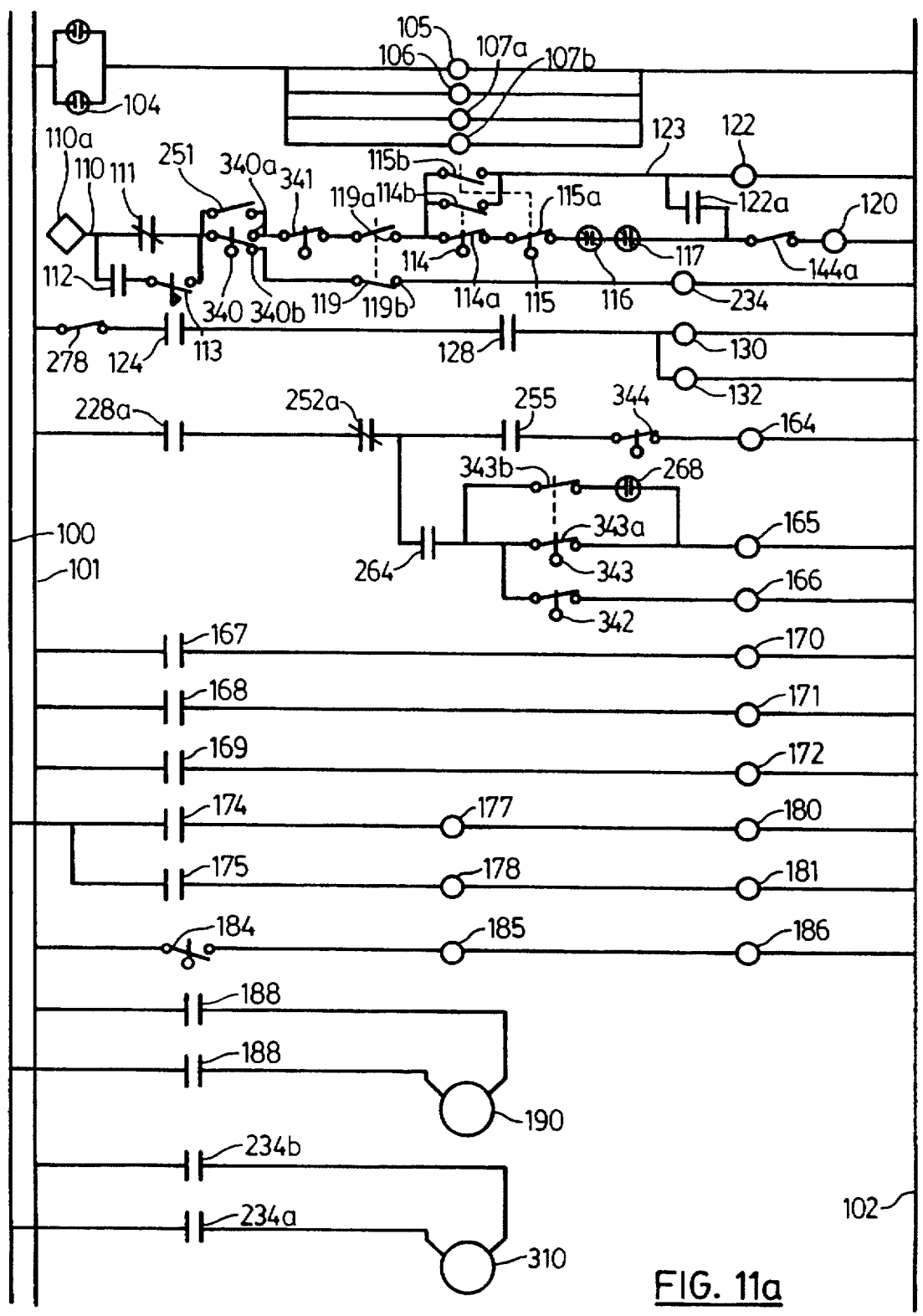
Figure 12A:
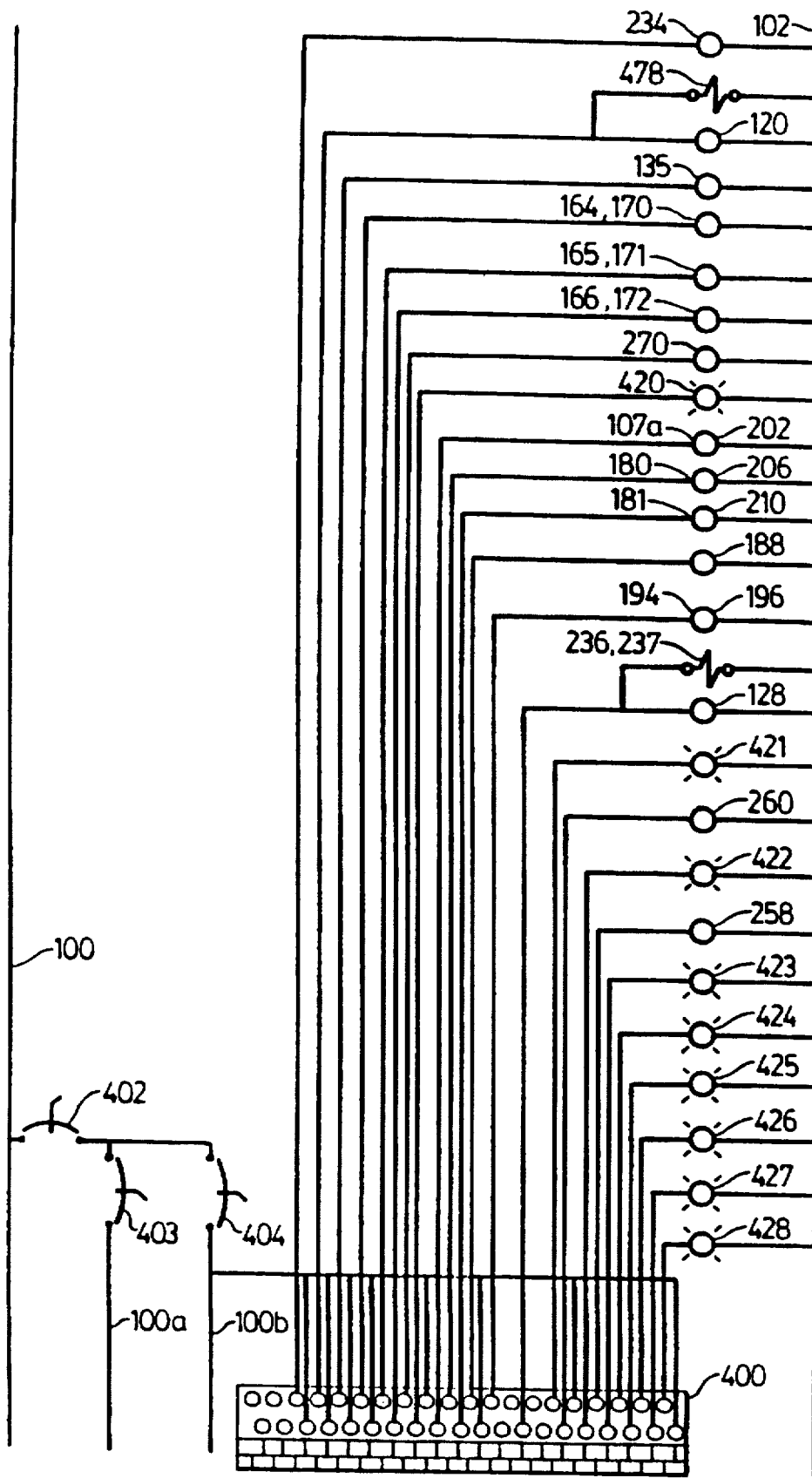

FIGS. 7a, b, c and d shows baffles fitted in the sludge supply system of the apparatus;

FIG. 8 is a perspective view showing a pipe network for supplying sludge to the apparatus;

FIG. 9a, b and c are views of combustion gas baffles of the apparatus;

FIG. 10 is a perspective view showing a support arrangement of the evaporation unit of the apparatus;

FIGS. 11a, b and c are an electrical schematic of the control circuitry for the apparatus;

FIGS. 12a, b, c and d show a schematic of a second control circuit; and

Figure 12B:
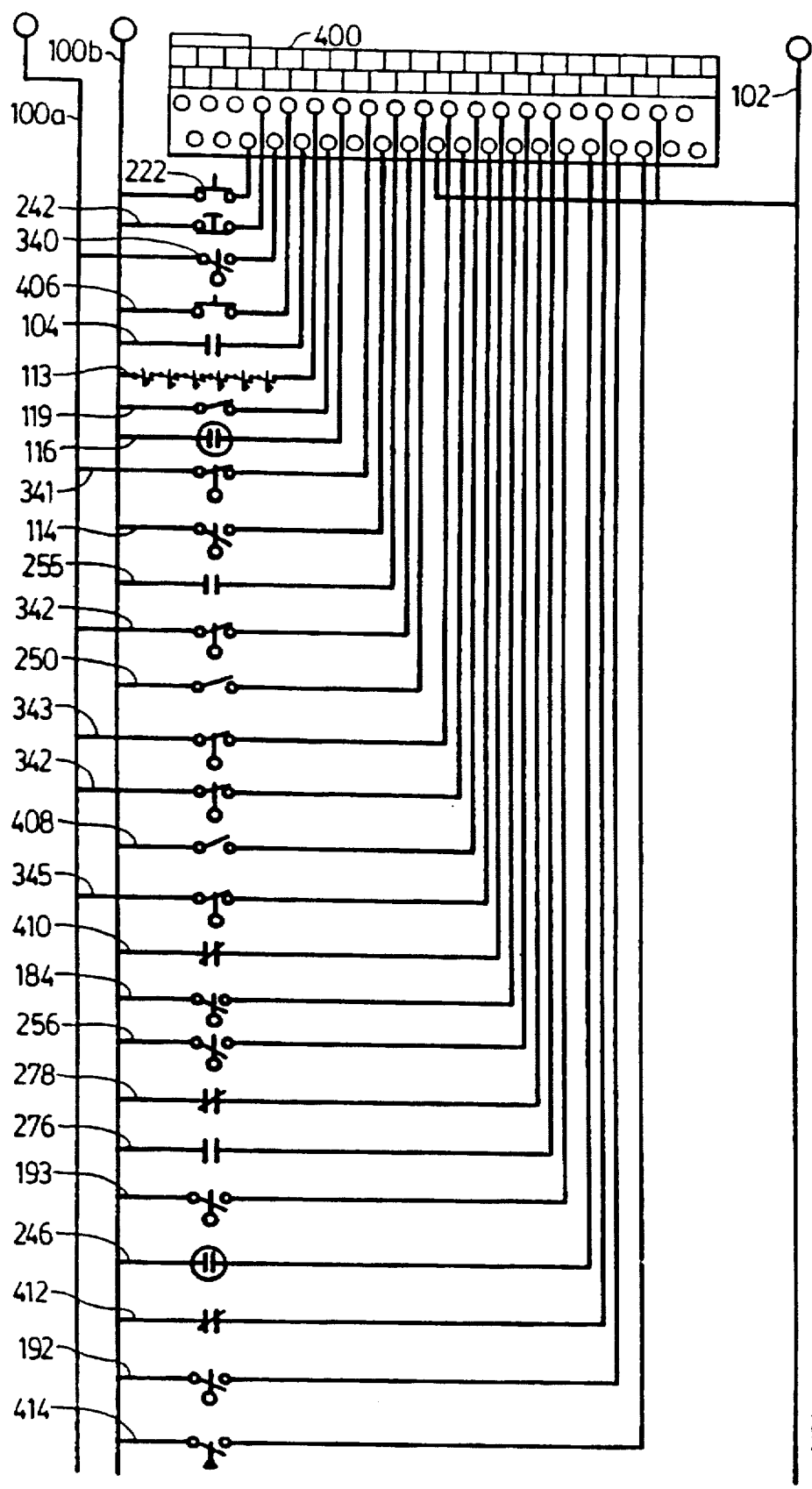
Figure 12C:
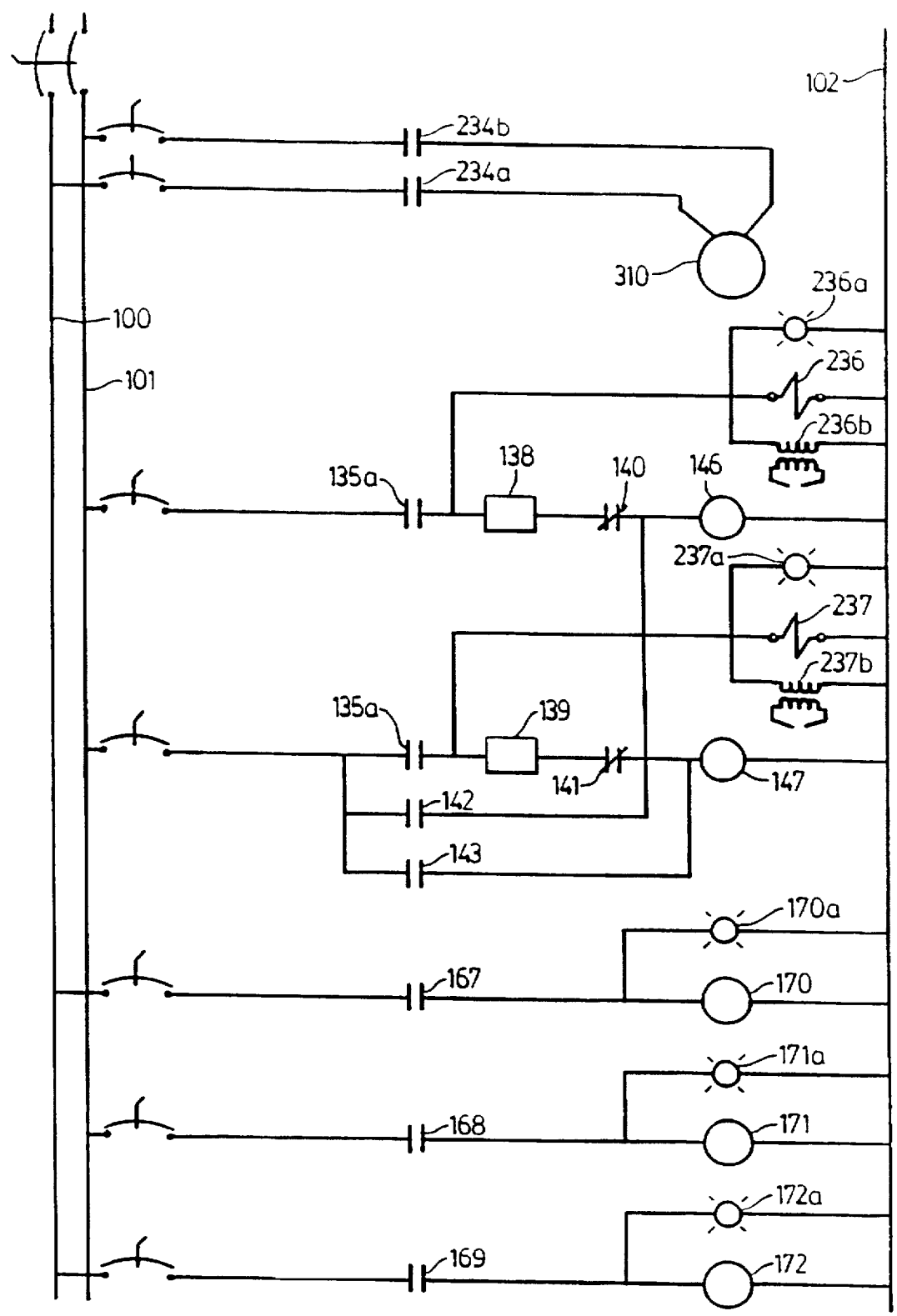
Figure 12D:
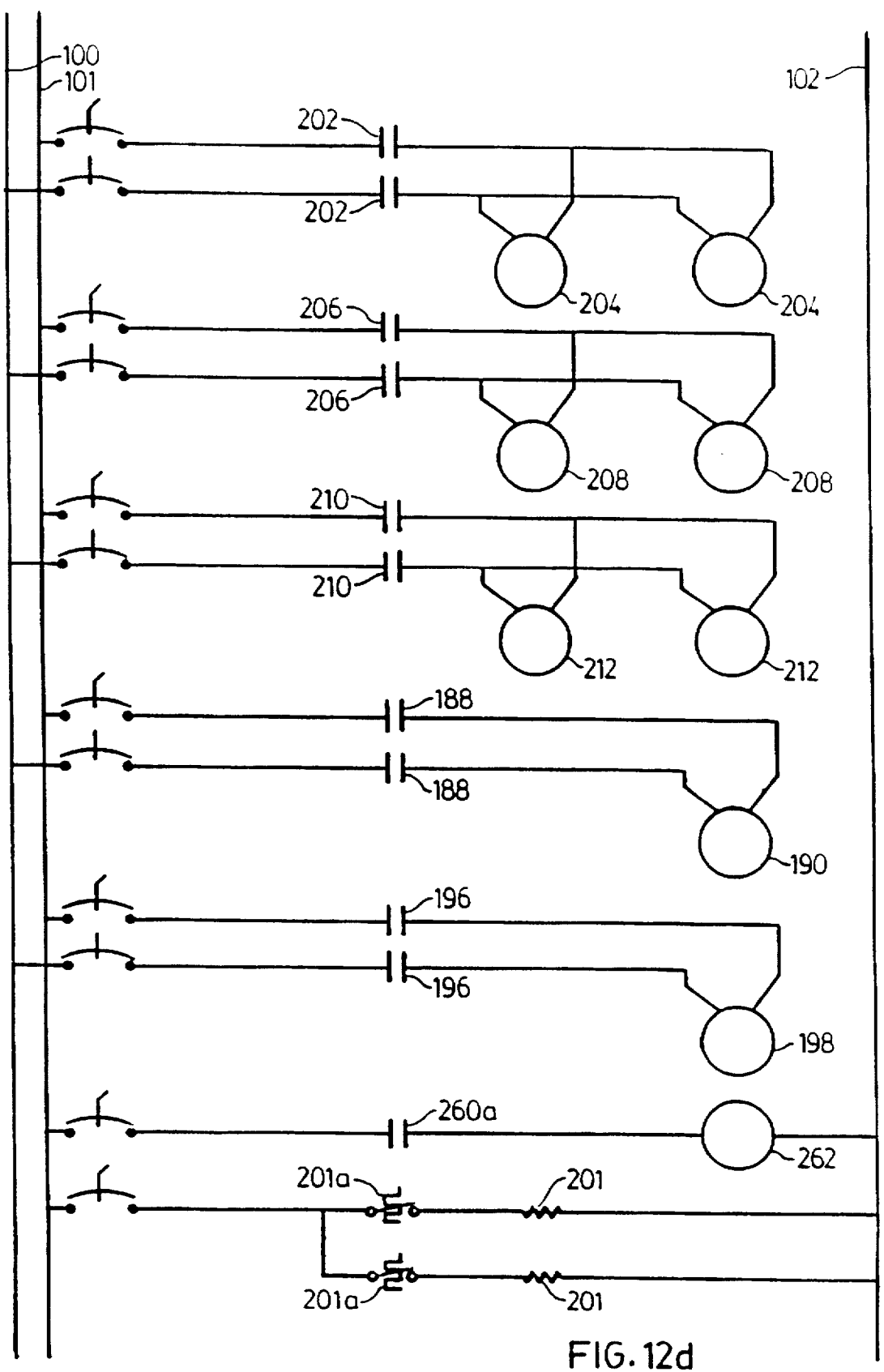
Figure 13A:
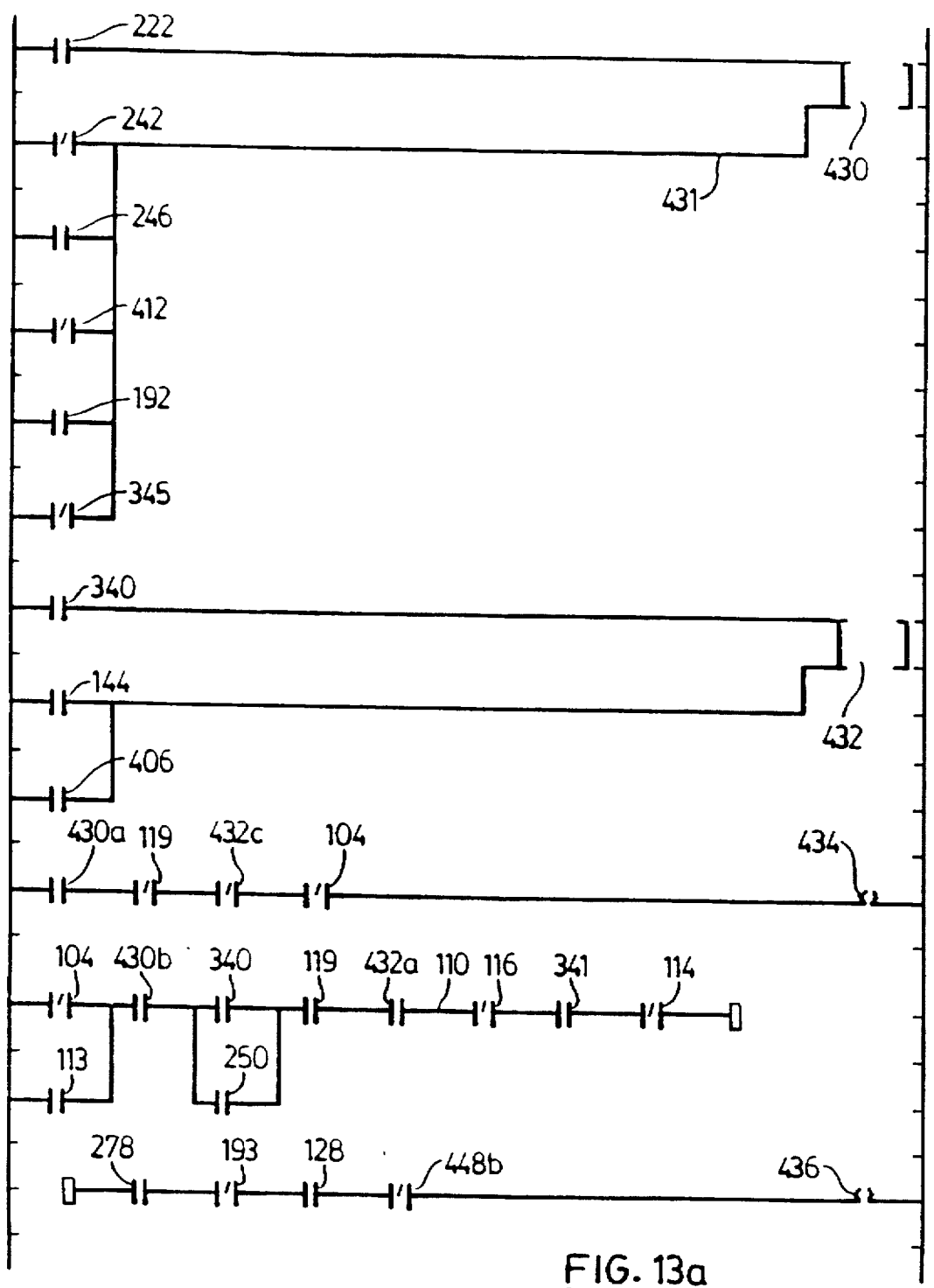

FIGS. 13a, b, c, d, e and f show Ladder Logic of the circuit of FIG. 12.

DESCRIPTION OF THE PREFERRED EMBODIMENT

Figure 1:
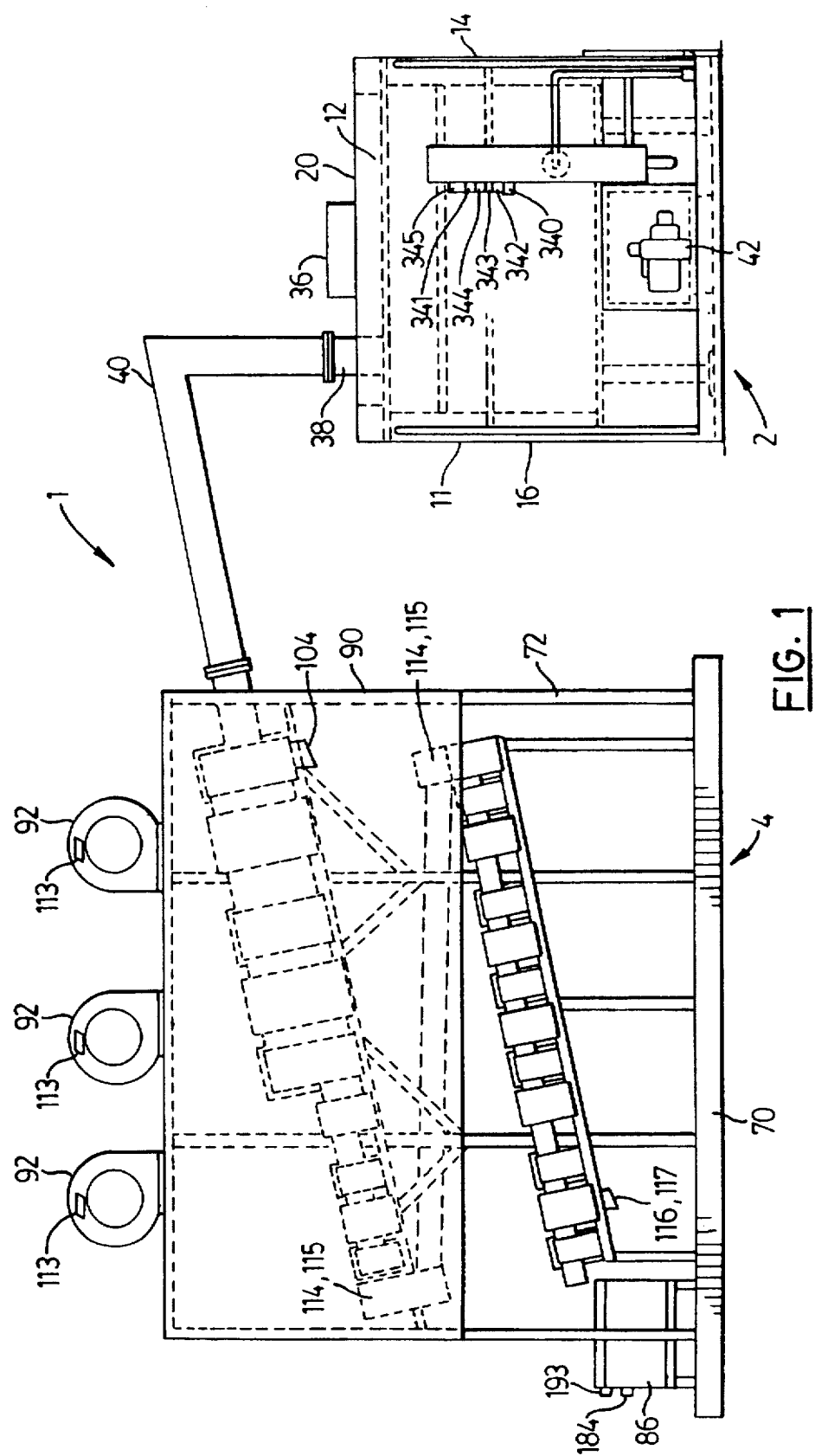
FIG. 1 is a side view of the apparatus.

FIG. 1 shows an apparatus in accordance with the present invention, generally indicated by the reference 1. The apparatus 1 includes two basic elements, namely an evaporation unit 2 and a condensing unit or heat exchanger 4, which are described in turn below.

As shown in FIG. 3, the evaporation unit 2 is of generally rectangular section and has a depth slightly less than its length or width. The evaporation unit 2 has two longitudinal support members 10 for supporting the unit, and facilitating transportation of the unit 2. The unit 2 has a housing,11 including external side walls 12, end walls 14, 16 (FIG. 5), a bottom wall 18 and a top wall 20. Within the unit 2, there is a waste oil distillation or evaporation chamber 22, which is spaced inwardly from all the outer walls of the unit 2. The chamber 22 is supported on a plurality of support cylinders 23 as shown in FIG. 10, so as to enable free movement of hot gases around the waste oil chamber 22 and within the exterior walls 12–20. Each support cylinder 23 is provided with a metal plate 23a at either end, and the chamber 22 is freely mounted on the top plates 23a, to allow for thermal expansion and contraction. The waste oil chamber 22 has a flat bottom 24. The chamber is made from 304L stainless steel. Extending up from this are side walls 26 which connect to a top wall 28. These walls 24, 26, 28 extend up to chamber end walls 29. In one end wall 29 there is a chamber access door 34, for an access opening extending through the respective end wall 14 to the chamber 22. As detailed below, the purpose of the door 34 is to enable the solid, cake-like material, left in the chamber 22 after use of the apparatus, to be removed, prior to further use of the apparatus. Appropriate access doors can be provided for the combustion chamber. The chamber 22 also has, in known manner, longitudinal and transverse reinforcing or stay bars, to withstand the internal pressure of a full charge of waste oil.

In the top wall 20, there is an exhaust opening 36 which, although not shown, would be connected to a suitable exhaust stack. For the evaporation chamber 22, an outlet 38 is connected through to a connection duct 40.

At either side of the evaporation unit 2, and mounted on each side wall 12, there is a blower 42 for a respective burner within the combustion chamber 32. Associated with each blower 42 is a fuel supply (not shown) for a suitable fuel. This could be fuel derived from the method of the present invention, or the method of my earlier application, or alternatively some entirely separate fuel source.

As shown in the front view of FIG. 3, the support members 10 extend on one side of the distillation unit 2 at a greater distance then they extend at the other side. This is to accommodate a waste oil supply system providing an inlet for the waste oil. FIG. 6, 7 and 8 show this system and the associated pipe supply network in greater detail.

Referring to FIGS. 3, 6, 7 and 8, an inlet 300 is connected to a waste oil tank and divides into two lines passing through a pair of 3" strainers 302. The two flows then pass through respective 2" steel ball valves 304. The flow is then recombined in a main inlet conduit 306. The conduit 306 has a first branch 307 connected directly to the evaporation chamber 22, and a second branch 308 connected to a number of supply pumps, detailed below.

Connected in parallel with the supply conduit 306 is a 1½ TEEL pump with a 3 H.P. motor, the pump being denoted by the reference 310 and forming an initial supply pump. On either side of the pump 310, there are control valves 312, to enable pump to be isolated. Correspondingly, there is a valve 314 in the main supply conduit 306, for closing that conduit when flow is to pass through the supply pump 310.

The second branch 308 continues through a 2" check valve 316, and is then connected through to a ½ GPM pump 318, a 1½ GPM pump 322, and a 2 GPM pump 326. The connection to the pumps 318, 322 and 326 are through respective 1" steel ball valves 319, 323 and 327, and through respective 1½' strainers 320, 324 and 328. The three pumps 318, 322 and 326 have outputs, with respective 1" steel ball valves, 321, 325 and 329, connected to a service tank 332 (FIGS. 3 and 6) by respective pump supply pipes 347, 348 and 349.

The service tank 332 is connected by a first connection pipe 334, comprising a 3" diameter pipe with a steel gate valve (not shown) to a float tank 336. A second connection pipe 338 is a 6" diameter pipe and connects the service tanks 332 to the chamber 22.

The float tank 336 is fitted with six floats, which are detailed below in relation to the electrical control circuit. The lowermost float is a low level float switch 340. Above the float 340, there are three floats 342, 343 and 344 for activating the 2 GPM pump 326, the 1½ GPM pump 322 and the ½ GPM pump 318, respectively. A burner circuit surge or safety float 341 is located above the three floats 342–344. Finally, an uppermost float switch 345 is a high level safety float.

To control supply of the oil, and prevent surges in the oil supply, a variety of baffles are provided between the service tank 332, float tank 336 and chamber 22. These will now be described with reference to FIG. 7. Many of these baffles are configured to prevent or at least reduce convective heat transfer between two bodies of oil of different temperatures. In particular, a first baffle is designed to minimize convective heat transfer between relatively hot oil in the chamber 22 and relatively cool oil in the first connection pipe 338.

As shown in FIG. 7a, the first baffle 351 is provided at the inlet to the chamber 22, and a second baffle 352 where the service tank 332 flows into the pipe 338. Similarity, third and fourth baffles 353 and 354 are provided at either end of the second connection pipe 334 adjacent the service and float tank 332, 336 respectively.

FIG. 7a shows the first baffle 351, which is generally circular with a diameter of 6". It has four ⅝" diameter holes around the outside indicated at 355 and a hole or aperture 356 offset from the centre. This aperture 356 is for an extension 347a of the pump supply pipe 347, which continues at 347a through the service tank and second connection pipe 338 into the chamber 22.

The second baffle 352 is provided at the top of the wall of the service tank 332. At the bottom and top, it includes a drain hole 357 for liquid and a vent hole 358 for vapor, both having a diameter of ½". Above the drain hole 357, there is an aperture 359, again for the extension pipe 347a. Above this there is a level port 360 which has a horizontal width of 3" and a height of 1".

Figure 7C:
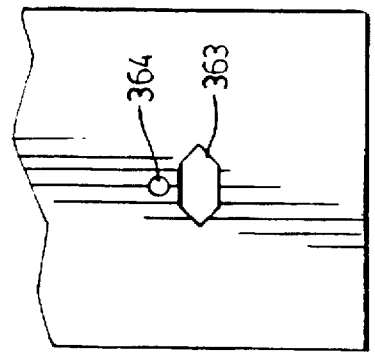
Figure 7B:
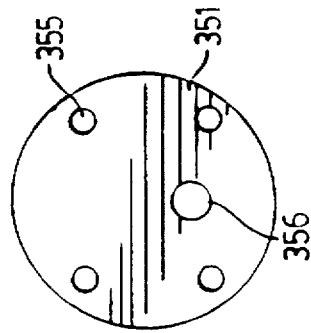

The third baffle 353 into the service tank 332 from the connection pipe 334 is shown in FIG. 7c and includes a ½" diameter drain hole 361 and a level port 362. The level port, again, has a height of 1" but here it has a horizontal width of 2". It is expected that oil flow or level adjustment will occur primarily through the level port 362, as for the other level ports.

Figure 7D:
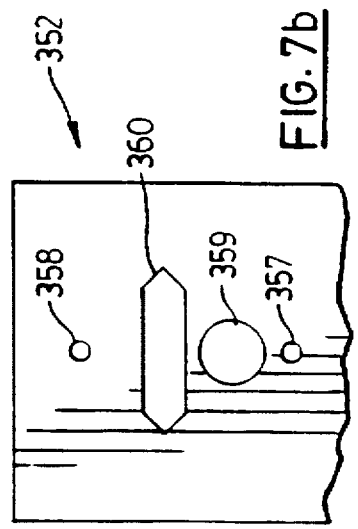

Correspondingly, the fourth baffle plate 354, shown in FIG. 7d, has a level port 363 with the same dimensions as the level port 362, and above this a ½" diameter vent port 364.

The pumps 318, 322 and 326 are connected by respective pump supply pipes 347, 348 and 349 to the service tank 332. The pipes 348 and 349 open directly into the service tank, whereas as detailed below, the pump supply pipe 347 continues at 347a into a pipe leading directly into the chamber 22. This enables a steady slow supply of cool oil to be fed into the chamber 22, to prevent a backflow of hot oil into the supply and service tanks, etc.

Reference will now be made to FIG. 9, which shows an arrangement of combustion baffles within the housing 11.

FIG. 9a shows the baffle assembly inside the front end wall 14. A front lower flow deflector or baffle 370 has openings 371 at either end to permit flow of hot exhaust or combustion gases upwards. A front middle flow deflector 372 is continuous and forces the exhaust gases to flow to the sides. The front top deflector 373 has a central opening 374 as indicated.

The side walls 12 are similar as shown in FIG. 9c. Here, a lower side flow deflector 376 is continuous. A central side flow deflector 378 has a central opening 379, and again a side top flow deflector 380 is continuous.

Reference will now be made to FIG. 9b, which shows the flow deflectors within the rear end wall 16, which generally correspond with those for the front end wall 14. A lower flow deflector 382 has openings 383 at either end, corresponding to the openings 371. A central middle flow deflector 384.is continuous, and an upper flow deflector 386 has a central opening 387.

Thus, in use, combustion or exhaust gases from the two burners can flow upwards through the openings 371, 383 at the front and back to a space above the lower flow deflectors. The gases are then deflected from the front and back to the sides of the chamber 22 and up through the opening 379, into the space between the middle and upper flow deflectors. The gases then have to travel back around to the front and back of the chamber 22, before exiting through the openings 374, 387. This arrangement ensures that exhaust gases travel a relatively long path and permits heat transfer between the hot combustion gases and the chamber 22. Exhaust gases then travel across the top of the chamber 22 to the exhaust stack opening 36.

To permit evaluation of the state of the contents of the chamber 22, a drainage tank 390 is provided connected via a 2" gate valve 392 to the chamber 22. It is also connected by a vent line 394 including a valve 396 to the branch line 307. Drainage tank 390 has an outlet valve 398, and the operation of the drainage tank 390 is described below.

Turning to the condensation unit 4, this similarly has a pair of support members 70, for supporting the unit for and facilitating transportation thereof. It includes a framework 72 which supports an array of condensation or heat exchange pipes, generally indicated by the reference 74.

The structure of the condensation pipes 74 is deliberately kept simple, whilst providing a large heat transfer surface in order to avoid problems associated with complex designs, e.g. complex fin configurations. Thus, the condensation pipes comprise a plurality of transverse ducts 76 arranged in two inclined layers indicated at 78 and 82. The layers 78 and 82 are generally similar, although the size of the ducts varies between the layers. The first layer includes a first section 79 of larger ducts and a second section 80 of smaller ducts, similar to the second layer 82. The reason for this is that in the first section 79 there is a greater percentage of vapor present requiring a larger volume. Otherwise the arrangement in the various layers is generally similar and is described in relation to the top layer 78.

Figure 2A:
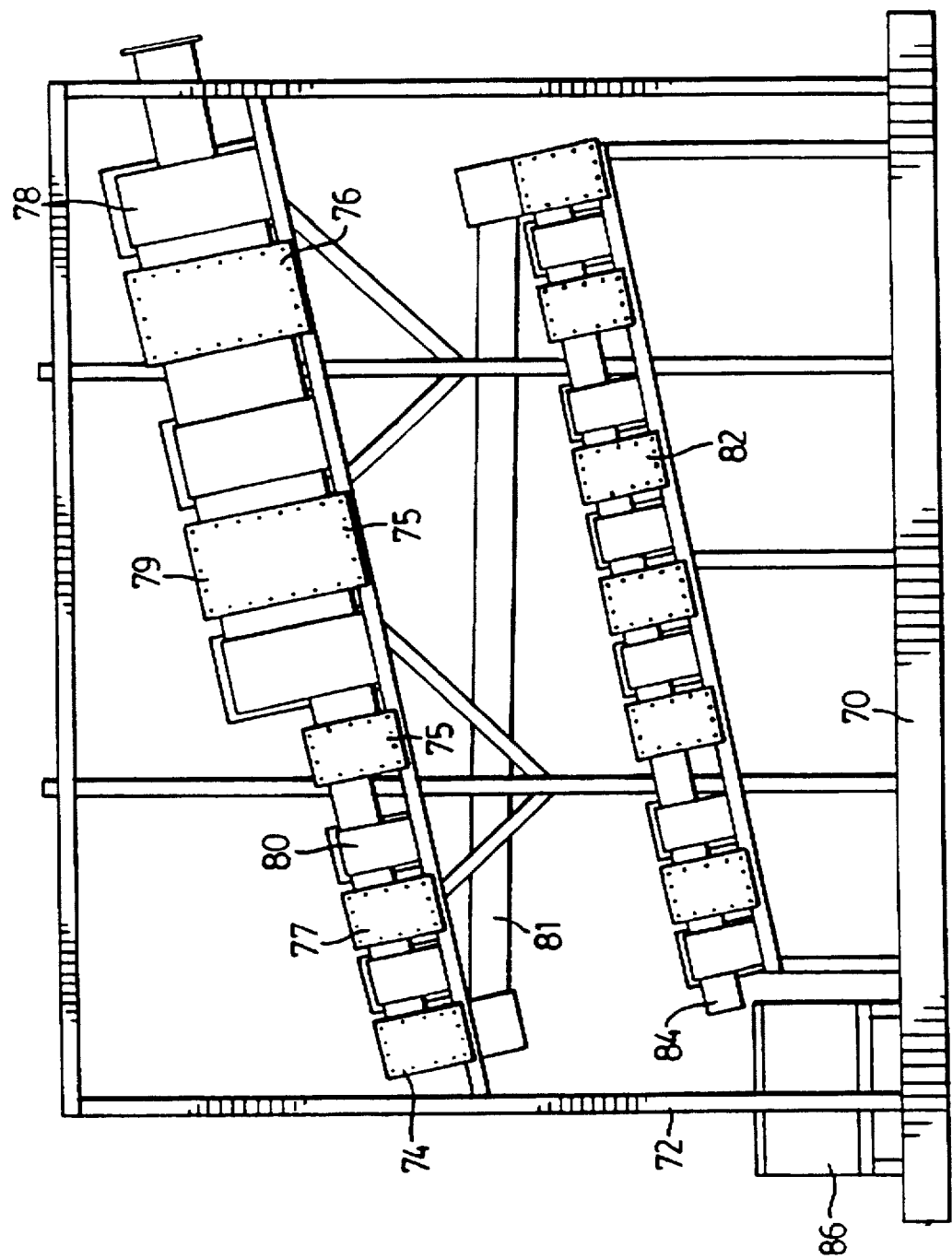
FIG. 2a is a side view on an enlarged scale, of the heat exchanger of the apparatus of FIG. 1.

In the first section 79 of the top layer 78, there is the larger size ducts 76 and smaller ducts 77 in the second section 80. These ducts 76, 77 extend transversely, i.e. perpendicularly to the plane of FIG. 2. The ducts 76, 77 are each provided with one access plate 75 which are provided at alternate ends of the ducts. Only the access plates on one side are shown in FIG. 2a. Alternate ends of the ducts 76, 77 are connected through to one another, so as to give a meandering or zig zag path. In other words, vapor entering the uppermost duct 76 from the connection duct 40 will flow to one end of that duct, and then through to the next transverse duct 76. The vapor then travels along the length of that duct 76 before flowing down to the next transverse duct 76, and so on. A connection pipe 81 is provided between the layers of duct 78, 82. Consequently, the vapor flows in a zig zag or sinuous path through the ducts 76, 77 and the top layer 78 and then through the connection pipe 81 to the upper end of the layer 82 where the process is repeated, this layer comprising solely smaller ducts 77. The bottom layer 82 ends in an outlet 84 for recovered oil, which is collected in a collection tank 86. This tank is fitted with a float switch, for limiting the level of recovered oil in the tank 86, as detailed below.

Figure 2B:
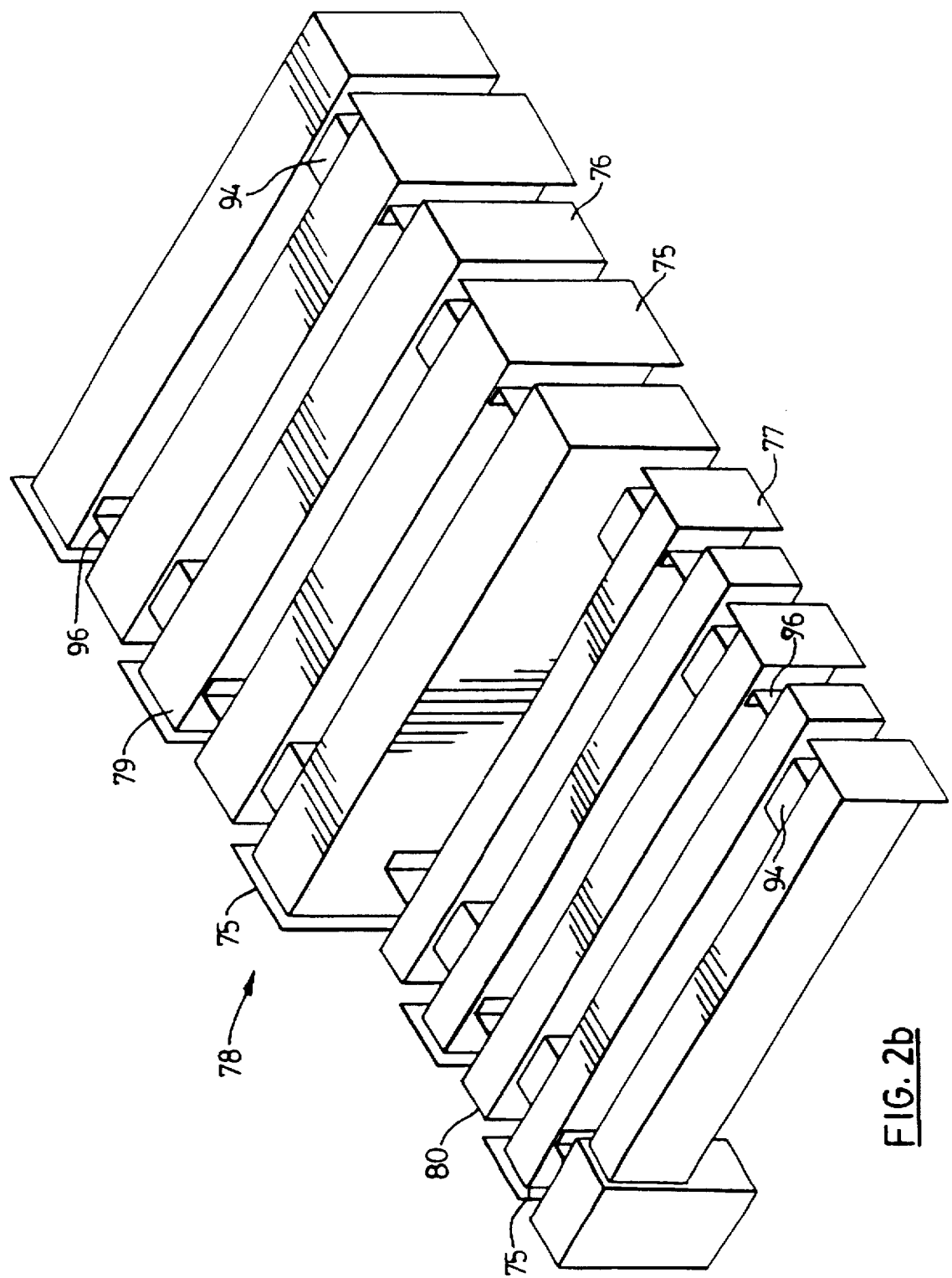
FIG. 2b is a perspective view of a layer of heat exchange ducts.

While FIG. 2a shows heat exchange ducts that extend transversely, it is possible for the ducts to extend longitudinally. Indeed, for greater heat exchange capacity, it is preferred for the ducts to extend longitudinally. Then, the overall length of the heat exchanger could be increased and the layer of ducts would incline from one side to the other. FIG. 2b shows an exemplary arrangement of large section ducts for the top section of such a heat exchanger. As before, the ducts 76 have access doors 75, which would be used for cleaning, to prevent buildup of a carbon deposit. Between adjacent pairs of ducts, there is a short connecting duct 94, and spacing brackets or reinforcements 96; these features would be present in all duct layers, but are only clearly shown in FIG. 2b.

The top layer 78 is enclosed within a housing 90 (FIG. 1). On top of the housing, there are six individual fans 92 arranged for drawing air from the ambient atmosphere and blowing it over the layers of ducts 78, 82. Thus it will be seen that the flow of cooling air, to effect condensation of the vapor is effectively in the same direction as the vapor flow.

In use, any water vapor present is condensed in the heat exchange ducts. Small drainage taps (not shown) are provided for this and corresponding drainage channels lead to a water collection tank (also not shown). If large quantities of water are generated, a removal pump can be provided, and the water can be treated in a water/oil separator.

Figure 11B:
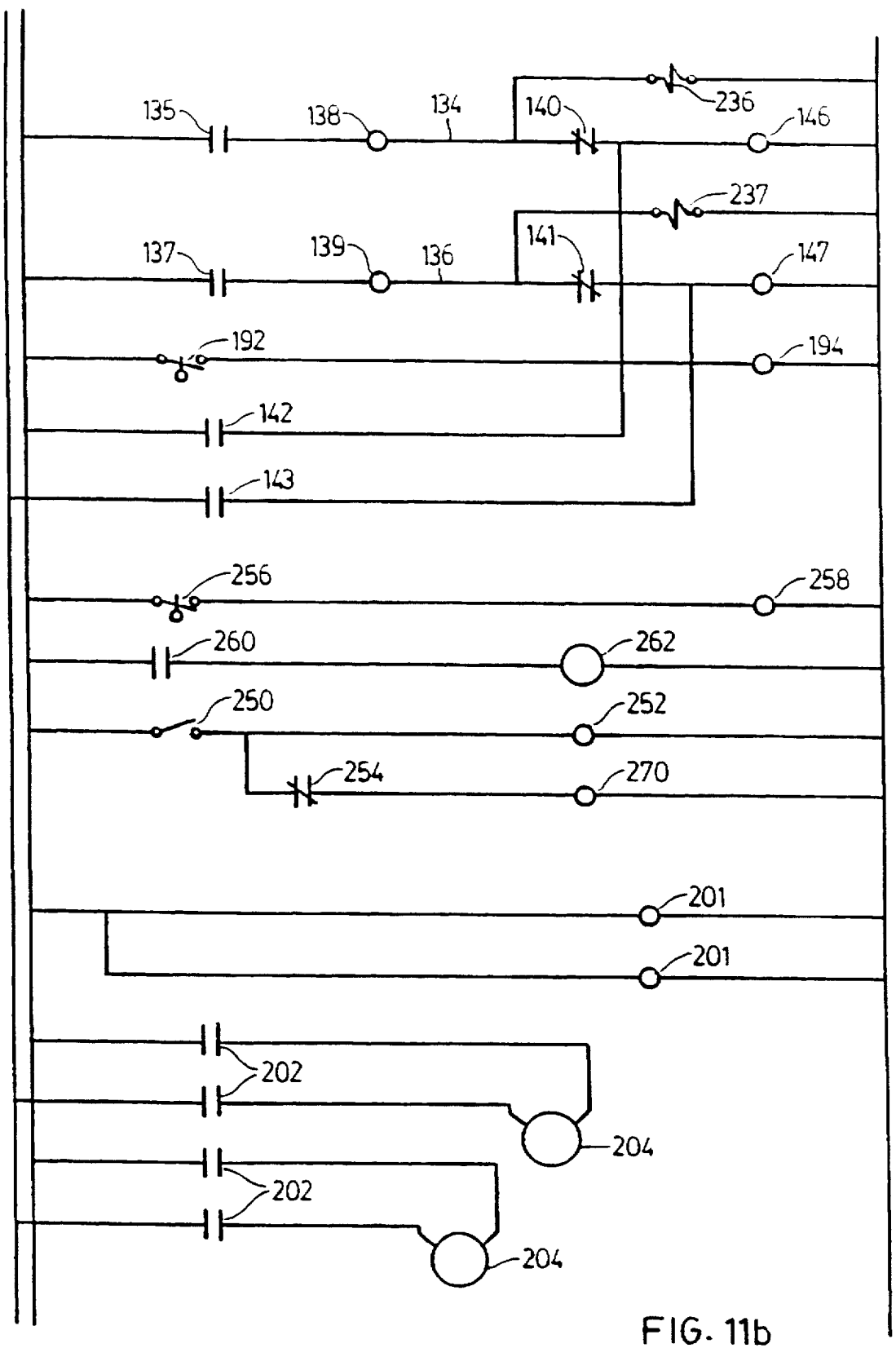
Figure 11C:
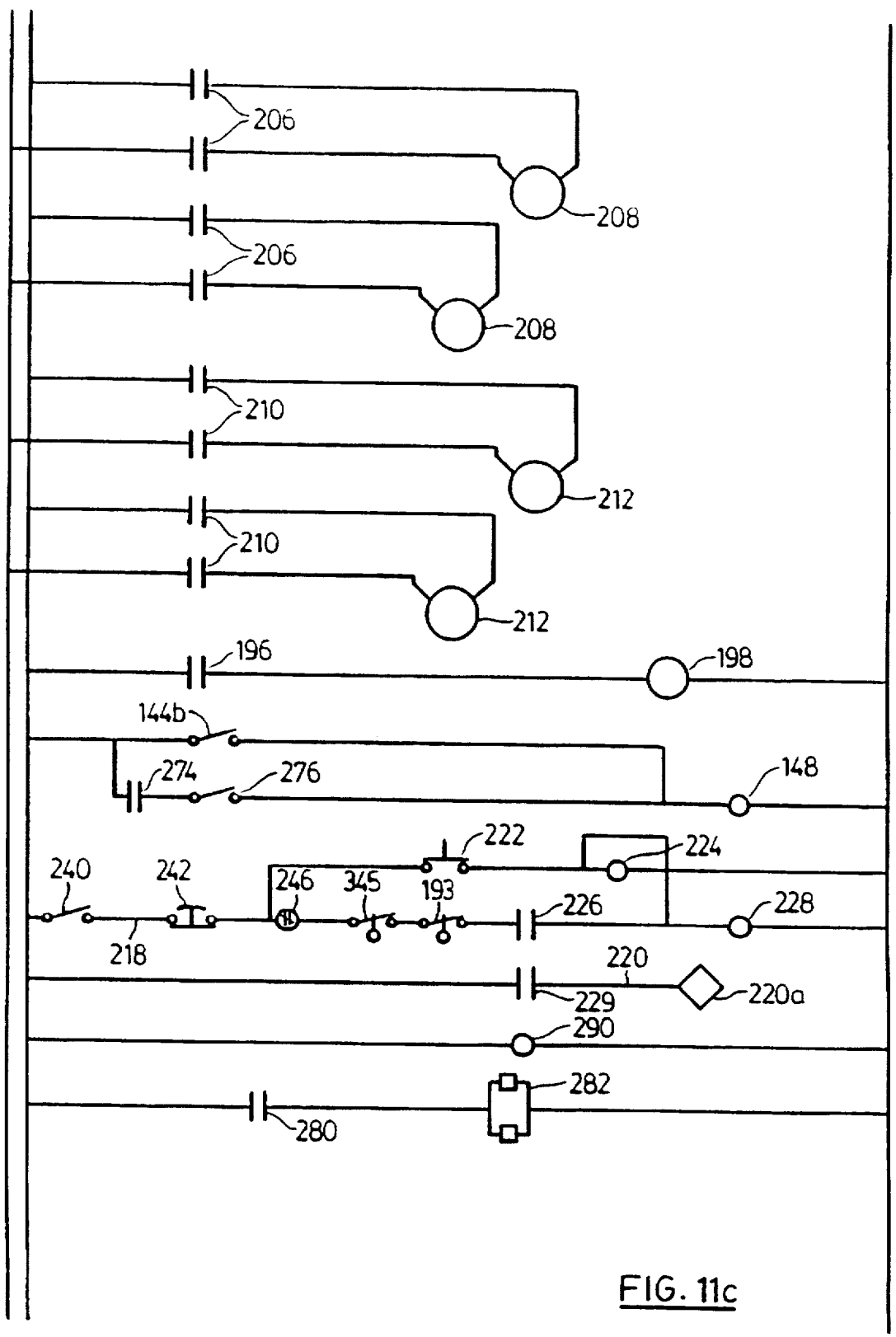

Turning to the electrical circuit shown in FIGS. 11a, 11b and 11c, in known manner this includes three supply lines 100, 101, 102 of a conventional supply with two phases and neutral. FIGS. 11a, 11b and 11c show various elements, which are not specifically itemized on FIGS. 1-3, and which are described below in the order in which they appear in those Figures. These various elements interact to form a control circuit as described below.

In a first line there are a pair of snap discs 104, mounted on the heat exchanger or condensing unit 4, arranged in parallel for controlling power supply to four control relays 105, 106 and 107a and 107b. The snap discs 104 close when the temperature reaches a predetermined level, here 130° F. When the temperature exceeds 130° F. at least one snap disk 104 closes to activate the relays 105, 106 and 107a, b and hence turn the fans on, as detailed below.

Relay 105 provides a control for the burner circuit and is intended to prove cooling air flow on the heat exchangers. Relay 106 controls the power supply to timers, detailed below, for delayed cooling fan start up. Relay 107a controls other cooling fan motors and relay 107b controls supply pumps and a bake circuit.

A line 110 includes a burner circuit with various elements in the line. There are two pairs of contacts 111 and 112 of the relay 105. The contacts 111 are normally closed whilst the contacts 112 are normally open. The contacts 112 are in series with sail switches indicated at 113 which detect the air flow through the condensation unit or heat exchanger 4. Thus, when the fans are turned off, the sail switches 113 are bypassed whilst power is routed through the sail switches 113 when the fans are operative. With sufficient air flow, the sail switches 113 are closed. Thus, when the relay 105 is activated, the contacts 111 are opened and the contacts 112 closed to route power for the burner circuit through the sail switches 113. Consequently, power will only be supplied if the sail switches 113 remain closed indicating adequate air flow.

The float switch 340 is a low level float switch, in series in the burner circuit, which detects the waste oil level in the chamber 22. It enables operation of the burners once a certain minimum or lower waste oil level is reached as indicated at 340a. Until this level reached it is switched to 340b enabling a further relay 234, which controls the supply pump 310.

The connection at 340a is to the burner circuit safety float 341, which ensures that the waste oil does not exceed a certain level for safe operation of the burners. In use, sudden boiling off of water or certain fractions can cause oil to back up into the float and safety tanks. This float switch 341 shuts off the burners until this surge action dissipates.

A bake or override switch 251 can override the low level float switch 340. Also, a supply pump lock out key switch 119 is provided, for controlling the supply to the burner circuit. When activated it energises the burner circuit at 119a and locks out the supply pump control circuit at 119b.

The supply pump 310 provides for rapid filling of the apparatus, and for safe operation of the burners, it is locked out so supply comes from lower capacity pumps only.

Two flow control float switches 114, 115 are mounted on an intermediate float chamber to the lower layer 82 of the heat exchanger. The switches 114, 115 are intended to detect a surge in the flow of condensates, which typically occurs during the initial start up, when volatiles are rapidly displaced from the chamber 22. The intermediate float chamber has an orifice sized for a certain flow rate. If this flow rate is exceeded, then the level in this float chamber rises, switching at least one of the float switches 114, 115. A line 123 including a timer 122 connects the switches 114, 115 to the line 102. The timer 122 controls contacts 122a. Each switch 114, 115 includes, in the line 110, a respective contact pair 114a, 115a, which in an open configuration prevent the burner operating. When closed, the switches 114, 115 result in the burner circuit being controlled by a temperature controller, detailed below. When a surge in output is sensed by the float switches 114, 115, control of the burner is switched through to the timer 122.

On the heat exchanger ducts 77, snap discs 116, 117 are provided, as a backup for the temperature controllers. If one of these snap discs is open, the burners will not operate. Provided the temperature is below a set level, namely 130° F., the heat exchange temperature is controlled by the temperature controller.

The snap disk 117 is in turn connected to a burner circuit control relay 120. The relay 120 controls contacts 124 for the burners. When energized, the relay 120 closes this contact pair, to enable the burners to start.

Thus, the overall operation of the switches 114, 115, is to interrupt normal burner operation if excess liquid or condensate level is detected. If at least one contact pair 114b, 115b is closed, control is passed to the timer 122. The burners are shut down repeatedly for a certain predetermined time, by the timer 122. This allows time for the excess liquid to drain from the condensation unit 4, whilst not shutting down the distillation unit 2 for such a long time that it cools significantly which in turn would slow restarting of production.

An override switch 144 is provided in the burner circuit, having contact pairs 144a, 144b. Contact pair 144a opens the burner circuit, whilst contact pair 144b provides an override to a blower control relay (FIG. 11c). Switch 144 is manually operated, with contacts 144a being normally closed and contacts 144b normally open.

For the burners, there is a temperature controller 128 connected to control relays 130, 132. A contact pair 124 of relay 120 and a bake timer switch 278 (detailed below) are in series with the temperature controller 128.

Correspondingly, for each of the first and second burners associated with the blowers 42, there is a circuit 134, 136. Circuit 134 includes a pair of contacts 135 of the relay 130, whilst the circuit 136 includes a pair of contacts 137 of the relay 132. Each of these circuits 134, 136 includes a respective CAD flame detector 138, 139, which in turn are connected to respective pairs of normally closed contacts 140, 141 of a relay 148. The outputs of the flame detectors 138, 139 are also connected to respective-delayed oil valves 236, 237, which delay the oil flow until the pump and the blower are up to pressure.

The contacts 140, 141 are connected to respective blower motors 146, 147, for the blowers 42, for supplying power thereto.

In normal use when the burner circuit control relay 120 is activated, the contact pair 124 closes activating the relays 130, 132, as controlled by the temperature controller 128. The relays 130, 132 in turn close the contact pairs 135, 137 to activate the blower motors 146, 147.

A blower override circuit (FIG. 11c) includes contacts 144b of the override switch 144 and the override relay 148. The relay 148 includes the pairs of contacts 140, 141, and also additional contact pairs 142, 143. In use, with the switch 144 closed, the relay 148 is actuated, to close the contact pairs 142, 143, whilst simultaneously opening the contact pairs 140, 141, so that power is supplied directly to the blower motors 146, 147, overriding other control elements.

The supply pump control circuit includes a supply pump control relay 234. The 3 HP. supply pump 310 is controlled by two pairs of contacts 234a, b of the supply pump control relay 234. The pair of contacts 119b are closed, to enable the apparatus to be filled. This activates relay 234, in turn activating the supply pump 310. When the required minimum level is reached, the low level float switch 340 opens contacts 340b and closes contacts 340a. Power is then cut off to the pump 310, and additional pumps can take over when switch contacts 119a are closed.

A pair of contacts 228a of a control relay 228, detailed below, control power supply to other pump motors. The contact pair 228a is connected through another contact pair 252a, which is normally closed. The contacts 252a are controlled by control relay 252, which in turn is activated by bake mode switch 250. Thus, in normal operation, the relay 252 is not actuated, leaving the contact pair 252a closed. For bake operation, the relay 252 is activated, to open the contact pair 252a thereby cutting off power to the supply pumps.

The contact pair 252a in turn is connected through a temperature alarm 255, whose function is to start the ½ GPM pump motor, when the temperature exceeds a preset limit, here 200° F. It has been found that if the initial charge of waste oil contains a lot of water, there can be a considerable time period, e.g. one hour, while this water is being boiled off. During this time to prevent back flow of hot oil in the supply system, the ½ GPM pump is activated, at a temperature below the boiling point of water. Condensate collected during this period can be separated from subsequent condensate. The alarm 255 is in turn connected to the float switch 344 for a half gallon per minute pump motor, to ensure the chamber is not overfilled. This in turn is connected to a relay 164 controlling contact pairs 167, to supply power to the half gallon per minute pump 170.

The normally closed contact pair 252a is also connected through the pair of contacts 264 of the relay 107b. This supplies power to circuits controlling the 1½ GPM and 2 GPM pump motors.

The float switch 343 comprises first and second contact pairs 343a, 343b connected directly through to a respective relay 165. The second contact pair 343b is connected through a snap disc 266, and opens at a higher level. If a high temperature is sensed by snap disc 268, it activates pump motor 171, to keep the service tank cool.

A control circuit for a 2 gallon per minute pump includes a float switch 342 and respective relay 166.

Relay 165 controls contact pair 168 whilst the relay 166 controls contact pair 169. These contact pairs in turn control power to the pump motor 171 for the 1½ GPM pump 322 and 172 for the two GPM pump 326.

The relay 106 has two contact pairs 174, 175, for starting timers 177, 178, which are set respectively for periods of four seconds and eight seconds. The purpose of these timers is to provide a delay for the starting of the fans 92, for the heat exchanger or condensing unit 4. The timers 177, 178 control respective relays 160, 181.

A refined fuel, or recovered oil, float switch 184, mounted on tank 86, is connected to a recovered oil control relay 186 via an on-delay timer 185, which prevents too frequent cycling of the pump. This relay 186 in turn has contact pairs 188 that control a pump 190 for pumping the recovered oil or refined fuel from the collection tank 86. When a certain level is reached, the pump 190 is activated to pump the recovered oil from the tank 86.

A safety float switch is provided on the collection tank 86 and includes two contact pairs 192, 193. The first contact pair 192 controls an auxiliary pump relay 194. The relay 194 has a pair of contacts 196, which switch power to the actual auxiliary pump motor 198 (the function of contact pair 193 is described below).

A pair of nozzle line heaters 201 are provided for the feed lines of the burners.

The relay 107a has four pairs of contacts 202, for controlling the power supply to fan motors 204 of the fans 92. It is to be noted that all the fan motors are connected between the supply lines 100, 101.

The other four fan motors have their power supply controlled by the timers 177, 178. The overall effect of this is to ensure that, on switching the apparatus on, two fan motors 204 start up initially, and the other fan motors start up in pairs, at four second intervals, to prevent overloading of the supply circuits.

The relay 180 has four contact pairs 206 controlling the power supply to fan motors 208; and the relay 181 has contact pairs 210 controlling the power supply to fan motors 212.

A line 218 is a main control line and includes a key operated switch 240, which is opened when the chamber 22 is opened for cleaning, to prevent burner operation during cleaning. An emergency on/off switch 242 is provided, for quickly shutting the apparatus down.

The line 218 splits, with one branch connected through a momentary motor start switch 222 and a motor control relay 224. Another branch includes a further safety snap disc 246 which is normally closed but opens above 130° F., and which is mounted on the float tank or chamber 336. The high level safety float switch 345 for the level in the float chamber or tank 336 and a safety float switch 193 on the collection tank 86 are connected in series. The safety float switch 193 is associated with the switch 192, and if activated, the apparatus will require manual reset. In effect, this pair of switches ensures that the burners cannot be turned on unless these levels are below upper preset safety levels. It is to be noted that a variety of safety switches could be inserted here, for example, ceiling temperature sensors. The relay 224 closes a pair of contacts 226 which in turn activates a secondary control relay 228. This latches the relay 224 in an operating state, assuming the other switches are closed.

The relay 228 closes a pair of contacts 229 in a line 220. The connection at 220a is connected to the burner circuit 110 at 110a.

The bake mode switch 250 is further connected to a pair of contacts 254 of the relay 107b, these contacts being normally closed. In other words, the contacts are opened when the fans are operating. The contacts 254 are in turn connected through to a bake timer 270.

For bake operation the relay 228 closes a pair of contacts 274 in a line including a bake timer switch 276. The bake timer switch is usually open, but is closed when the bake timer determines that the bake operation has been completed.

The bake timer switch 276 and also the bake override switch 144b are connected to the control relay 148, which controls the contact pairs 140–143. Activation of the 148 has the effect of powering the blower motors 146, 147 and disconnecting control of these motors from the flame detectors 138, 139.

A further bake timer switch 278 is connected to the lines including the control relays 130, 132 for the burner blower motors. This switch is normally closed but is opened by the bake timer 270. The control relay 228 additionally controls the contacts 228a enabling the power supply to the supply pump motors. It also controls contact pair 280, which energizers a temperature control display 282.

To ensure discharge of exhaust gases, an exhaust fan 290 is provided in an exhaust gas duct.

In use of the apparatus, during initial start up, fresh water vapor and then usually a large volume of the more volatile constituents of the waste oil evaporate quickly. This effectively causes a surge through the condensing unit 4. This is accommodated by the float switches 114, 115 and the timer 122. When the float switches 114, 115 detect an excess level, then the power to the burner circuit control relay 120 is switched through the timer 122. The timer is set for predetermined on and off periods. Here it is set for 10 seconds on, alternating with 40 seconds off. This maintains the temperature in the chamber 22, whilst reducing its output, thereby allowing excess condensate to flow out of the heat exchanger or condensing unit. It has been found in practice that, during initial start up, there will be numerous periods where the burners are shut down by the switches 114, 115, with the period between shut downs increasing, until all the volatiles have passed through and the burners can operate continuously without control by timer 122.

In use, the apparatus is operated for a certain period of time, with waste oil being continuously supplied to the evaporation chamber 22. Simultaneously, the tank 86 is periodically emptied, as it fills up. This causes the amount or level of solids or contaminants in the evaporation chamber 22 to build up. During this time the temperature controller 128 is set to a desired temperature. Practically, it has been found that the apparatus will run at an almost constant temperature, depending on the feedstock, and the controller can be set to some margin above the actual operating temperature.

After some time, the build up of solids in the chamber 22 will require the apparatus to be shut down. The drainage tank 390 is provided to enable the level of solids to be monitored. The valves 392 and 396 are opened to permit a sample to flow from the chamber 22 into the drainage tank 390. The valve 396 permits equalization of vapor pressure in the drainage tank 390 and the chamber 22. With the drainage tank 394 filled, the valve 392 is closed and the valve 398 opened to permit a measured quantity to be drawn off into a small steel vessel. This is then heated in an oven to drive off all liquids and vapors. It is then weighed to determine the weight of the solids therein. As the original sample volume was known, the percentage of solids can be determined. In this way, the build up of solids can be monitored, and once the level becomes too great, the apparatus will need to be shut down and cleaned. The exact level of solids that can be tolerated will depend upon the configuration of the chamber 22, and in particular, the means for supplying heat to it. The build up of solids acts as an insulator to inhibit heat transfer from the hot gases around the chamber 22 to the liquid within it. It is proposed to provide pipes running through the chamber 22 through which hot gases would pass. This would improve the heat transfer and permit a greater level of solids to build up within the chamber 22.

Once it is determined that the maximum allowable level of solids is present, then the supply of waste oil is turned off and a bake mode is started, by closing the switches 250, 251. The relay 252 is activated and opens contacts 252a, to disable the three supply pumps 318, 322 and 326. The contacts 254 will be opened, preventing the bake timer from starting a timing operation.

At this time, the burners can continue operation. The low level float switch 340 has been disabled, so that the waste oil level can be dropped to below that usually permitted. The fans will continue to operate, so long as the snap discs 104 senses a temperature in excess of that set.

When the heat exchanger 4 has cooled sufficiently, indicating that oil production has nearly ended, the snap discs 104 will open, the relay 107b will then no longer be activated closing contact pair 254, and hence activating the bake timer 270. The temperature in the evaporation chamber 22 is then raised to a final, baking temperature to remove as much as possible of the volatile or liquid components in the evaporation chamber 22. This temperature is set by the temperature controller 128. The controller 128 could be initially set for a temperature of 900° F. For the final baking step, where the sludge supply is turned off, the temperature controller 128 could be set for 1300° F.

The effect of this is to leave behind a solid, cake-like material which can readily be dug out from the evaporation chamber 22. This baking step is carried out until no further volatiles are being condensed and collected in the condensation unit 4, as determined by the bake timer 270.

When the apparatus is sufficiently cool, the access door 34 is opened, to enable the solid residue to be removed. The access door 30 will then be closed, and the process can be restarted with another batch of sludge.

At the end of the bake time, the switch 276 is closed and switch 278 opened. This has the effect of turning on the blower motors, to promote cooling of the evaporation chamber 22. The temperature controller 128 is isolated, to prevent operation of the burners.

With the contacts 276 closed relay 148 is activated. This in turn ensures that the motor blowers are powered through contacts 142, 143 to cool the chamber 22.

Reference will now be made to FIGS. 12 and 13, which show an alternative implementation of the control system for the apparatus of the present invention, using a programmable logic controller. The overall connections of the various external elements to the programmable logic controller is shown in FIGS. 12a–d, whilst a ladder logic of the control logic for the PLC is shown in FIGS. 13a–f. For simplification and consistency, components that are common with the control schematic of FIGS. 11a–c, are given the same reference numerals in FIGS. 12 and 13. This also ensures consistency with the hardware elements, such as float switches, identified in the earlier apparatus Figures.

FIG. 12 shows various external components, as connected between a programmable logic controller (PLC) indicated at 400, and supply lines 100, 102 as shown in FIG. 12a. A switch 402 connects through circuit breakers 403 and 404, rated at 1.0 and 2.5 amps, respectively, to branch lines 100a and 100b of the supply line 100. The line 100b is connected at suitable points to the PLC 400.

From line 100a, there are connections through the low level float switch 340, burner control safety float 341, floats 342 and 343 for the pumps, and high level float switch 345 to the PLC 400.

The line 100b is connected to other control elements. As shown, the main start switch 222 and emergency push button 242, and a reset key 406 are connected to the PLC 400. Similarly, the temperature controller 104 and sail switches 113 are also connected, with the sail switches 113 being connected in series as shown. An appropriate number of sail switches 113 can be provided, with six being shown.

A supply lockout key switch 119, temperature sensing snap disk 116 on the heat exchanger output and flow control float switch 114 are also connected to PLC 400, together with the temperature alarm 255 and bake switch 250.

A flare start switch 408 and temperature connection 410, not provided in the earlier embodiment, are connected to the PLC 400.

The refined fuel float switch 184, the water float switch 256, bake timers, 276, 278, safety float or backup switch 193 for the reclaimed fuel, and snap disk 246 on the float tank, and auxiliary refined fuel float switch 192 are connected to the PLC 400.

Two further inputs are provided, as compared to the earlier embodiment. A room temperature switch 412 and a pressure switch 414 are connected to the PLC 400.

Referring back to FIG. 12a, outputs from the PLC 400 are connected to a variety of control relays and indicator lamps. There are outputs to the relays 234, 135, 148, 164, 165, 166, 107a, 180, 181, 186, 194, 258. There is a further output to the bake timer 270. An output to a solenoid 478 on a flare stack, described below, is connected in parallel with burner circuit control relay 120. Solenoid for fuel valves 236, 237 are connected in parallel with the OMRON temperature controller. The following indicator lamps are connected to appropriate outputs: lamp 420 indicating flame in or present; lamp indicator 421 indicating room temperature too high; lamp 422 indicating that supply pump lockout has been actuated; an amber fault trip lamp 423; a lamp 424 indicating a backup or excess of refined fuel flow; a lamp 425 indicating refined fuel pump failed; lamp 426 indicating chamber 22 is overfull; lamp 427, in addition to lamp 424, indicating a flow backup; and a lamp 428 indicating that the heat exchanger is too hot.

In FIGS. 12c, d, there are shown various components similar to FIG. 11, and these are given the same reference numerals. Their function and arrangement is essentially the same, except as detailed below. As shown, appropriate fuses or trip switches are provided, in known manner.

For the burners 146, 147, a common relay 135 is provided which closes contacts 135a. Contacts 140–143 are still controlled by relay 148. Each of the pump motors 170, 171, 172 has a respective indicator lamp 170a, 171a and 172a, to indicate when it is operating. The fuel line heaters 201 are provided with thermostats 201a.

Referring now to the ladder logic of FIG. 13, it is first noted that many of the elements or switching functions are repeated in FIG. 13. This is solely to explain the logic employed in the PLC. Practically, in most cases, a single switch will suffice. Further, the logic shows many latches, contact pairs and the like, which are simply logic functions within the PLC, without any actual hardware implementation. It should also be appreciated that it shows contact conditions in the PLC 400. Practically, inputs from many sensors are inverted for PLC logic purposes; thus, many sensors are normally closed in the field or at the actual sensor, but the normal state in the PLC is taken as normally open.

The start switch 222 is connected to a logic unit, or latch or keep unit 430, which is identified as operating or closing a variety of latches 430a, b, etc. Like other latches described below, this will maintain the various contacts or switches 430a, b, etc. closed, until it receives an input from a reset line indicated at 431. Input 431 is connected to pushbutton switch 242, the snap disk 246 on the float tank, the room temperature switch 412, the refined fuel float switch 192 and the high level float switch 345. As shown, the snap disk 246 and the refined fuel float switch 192 are normally open. If an excess temperature of the float tank is detected or too high level refined fuel is detected, then one of these switches will close, latching the unit 430 out of the operating condition, and opening the various latches 430a, b, etc. For the other control elements, 242, 345 and 412, these are normally in a closed condition, as indicated. Thus the pushbutton 242 is normally in a closed condition, and the logic is such that no signal is sent through to the input 431. If the switch 242 is open, indicating an emergency condition, then this signal is, in effect, inverted and the signal is sent through to the input 431. This also applies to the sensing elements 345, 412.

The low level float switch 340 is connected to another latch unit 432. A preset input is connected to contacts of the blower-override switch 144, and switch 406 for supply pump restart. Latch 432 controls a variety of contacts or switches 432a, b, which are normally open, and also 432c which is normally closed.

In the next line, contacts 430a of a latch 430 are connected in series with the supply pump lockout key switch 119 which is, in this logic arrangement, normally closed, and contacts 432e of the latch 432. There is also the fan temperature controller 104, which here is normally closed. Thus, provided the fans are not operating, the latch 432 is open, and the supply pump has not been locked out by the key switch 119, then there is an output at 434 to the supply pump relay 234.

On the next line, equivalent to line 110, the fan control temperature switch 104 at the heat exchanger entrance is in parallel with sail switches 113, so either of them can close the line. Next, there is contact pair 430b, and then in parallel the low level float switch 340 and the bake switch 250. These are then connected through the supply pump lockout key switch 119, latch 432a, snap disk 116, surge float 341 and flow control float 114. Here supply pump key switch 119 is normally open, and hence the burners cannot be operated until the supply pump has been locked out by activating key switch 119. The line then continues through the bake timer switch 278, safety float switch 193, temperature controller 128 and pressure control latch 448b, and is then connected to an output 436, which in turn is connected to burner control relays 130, 132.

The next line is substantially identical, except that it omits the flow control switch 114 and includes flow timer contacts 440a of a flow timer 440. Control is switched to this line when there is an excess flow condition, to provide intermittent control of the burners to maintain the temperature of the chamber 22. This line has an output 438 for connection to the burners.

Figure 13B:
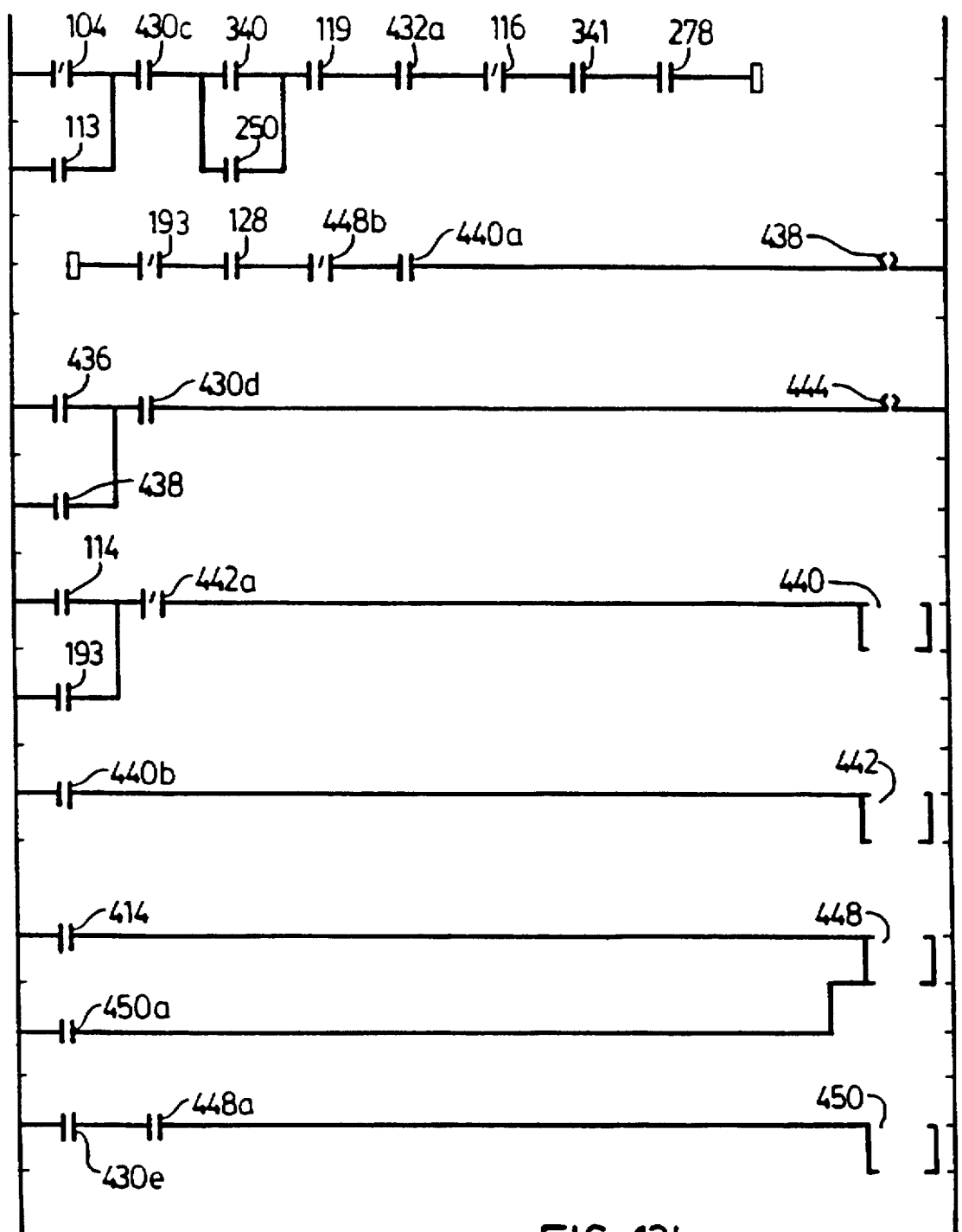

In both these two lines, the power will be supplied to the burners if the following conditions are met: either there must be sufficient airflow to the sail switches or the temperature must be below that set by the fan temperature control 104; latch 430 must be closed; either the low level float switch 340 indicates that there is sufficient oil present or the bake switch 250 is closed; the supply lockout key switch 119 must be switched to a position locking out the supply pump and closing the burner supply line; latch 432 must be operated; there must not be excess temperatures as sensed by snap disk 116; the surge float 341, which is normally closed, should not indicate a surge condition; bake timer switch 278 should be closed; the safety float switch 193 must be closed indicating no excess flow or level of refined fuel; and both the temperature controller 128 and pressure control latch 448 should be closed indicating acceptable conditions are prevalent. For the line in FIG. 13a, the flow control switch 114 should be closed, indicating that there is an acceptable flow rate through the heat exchanger, while the line at the top of FIG. 13b is controlled by the flow timer 440, as detailed below As shown in FIG. 13b, the timer 440 controls contact pairs 440b and a timer 442. Timer 442 controls normally closed contact pair 442a. As shown, supply to the timer 440 is also connected to both the flow control switch 114 and the safety float switch 193. Here, they are configured in a normally open configuration, so that with normal flow conditions, the timer 440 will not be activated. If either one of these detecting devices senses abnormal flow conditions, then a connection through to the burner output 436 will be interrupted as shown in FIG. 13a. Power will then be supplied to the timer 440. If this condition persists for long enough, by the time determined by the timer 440, this will close the contacts 440a and 440b. This will close the connection in the line to the flow output 438, permitting resumption of burner operation. This would be for a time determined by the timer 442. At the end of this time, the normally closed contact pair 442a will be opened, effectively resetting timer 440. This in turn will open the contact pair 440b and reset timer 442. Thus, whilst any excess flow condition or excess level is present as detected by contact pairs 114 and 193, the timers 440, 442 will control operation of the burners through output 438. Timer 440 effectively controls the length of time for which the burners are inoperative and timer 442 controls the length of time for which they do operate. These times can be determined periods can be varied depending upon characteristics of each apparatus and by routine experimentation. It is recommended, for example, that the burners are turned off for ten seconds and turned on for twenty seconds. This will enable an excess flow condition to dissipate, whilst at the same time, maintaining the temperature of the chamber 22 and preventing it cooling excessively.

The final burner output is at 444 and is in series with a contact pair 430d of the main latch 430. As shown, if either of the contacts 436 or 438 are closed, and the latch 430 is being operated, then there will be an output at the final burner output 444, connected to relay 135.

The pressure switch 414, on the upper row of the heat exchanger, is connected to a latch or logic unit 448. Logic unit 448 controls normally closed contacts 448b, as mentioned above, and also normally open contact pair 449a. This latter contact pair is in series with latch contacts 430e, and a timer 450, which in turn controls contact pairs 450a. If an excess pressure is detected in the heat exchanger by the pressure switch 414, this activates unit 448, which in turn starts the timer 450. At the end of the time period set by timer 450, this will reset the logic unit 448 at 450a. This ensures that if an excess pressure is detected burner operation is interrupted for a minimum period of time, to permit this condition to recover.

Figure 13C:
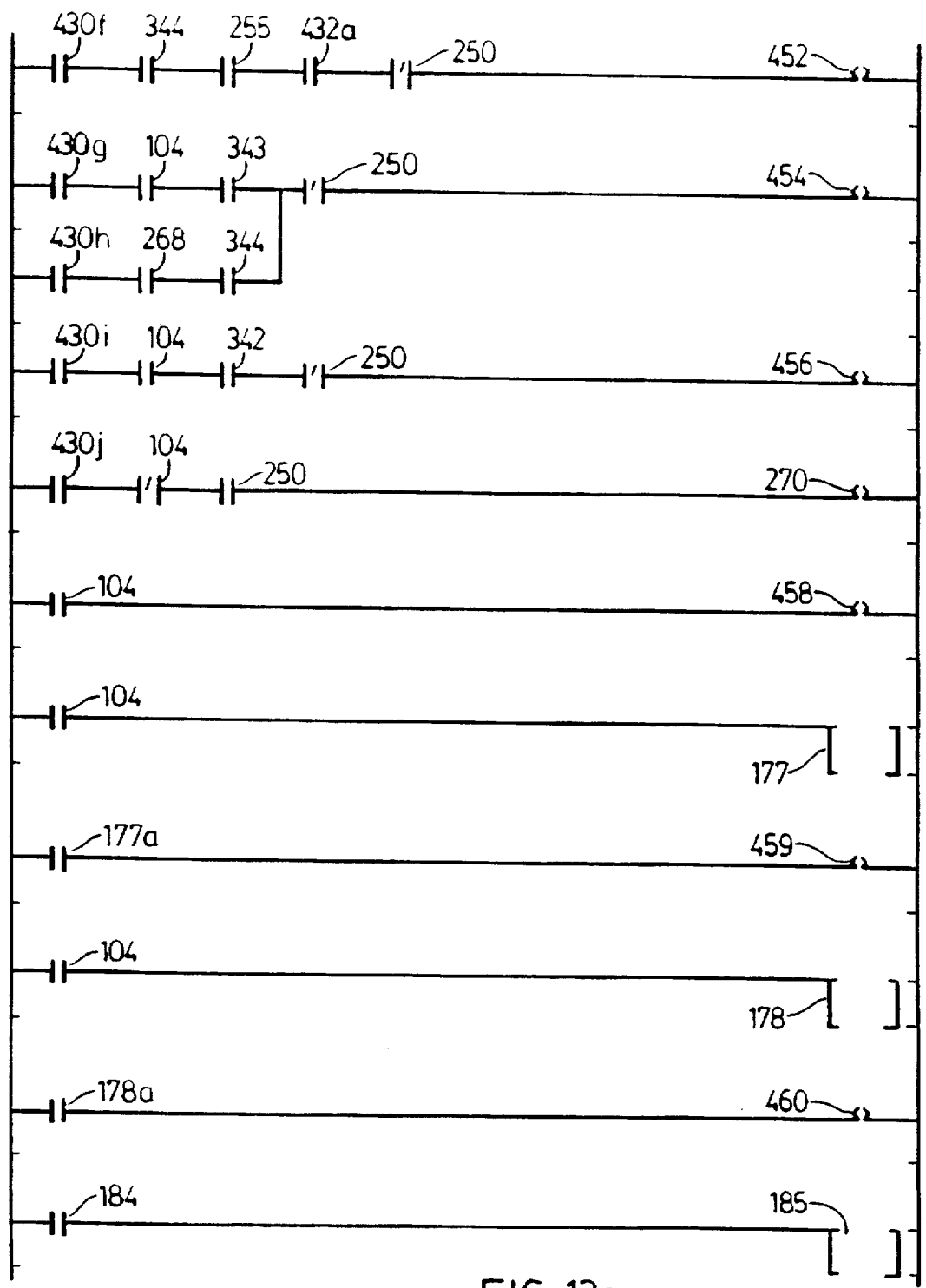

Turning to FIG. 13c, this shows at the top of the Figure, the control arrangement for the supply pumps, for which respective latches 430f, g, h and i are provided. For the ½ GPM pump, there is an output 452 to relay 164, connected in series with the ½ GPM float switch 344, with temperature control alarm 255 and normally closed bake switch 250. The alarm 255 is simply a temperature alarm point, set on the temperature controller 128. There is also a contact pair 432a of the latch unit 432. The alarm 255 ensures that this pump only operates when it detects a temperature that is too high. For the 1.5 GPM pump, there are two lines in parallel. One includes the fan control switch 104, which is temperature dependent, and the 1.5 GPM pump float switch 343. The other line includes the snap disk 268 and the ½ GPM float switch 344. These are then connected through the normally closed bake switch 250. Thus, once an adequate level has been reached, as detected by the low level float switch 340, logic or keep unit 432 is actuated. The 0.5 GPM pump can then be actuated by its float switch 344. The 1.5 GPM pump can be actuated by its own float switch 343, once the fan control switch 104 is closed. Further, if the ½ GPM float switch is closed and excess temperature is detected by the snap disk 268, i.e. the disk on service tank, then this can also be used to actuate the 1.5 GPM pump, to give adequate flow to effect cooling in the service tank. Thus, if flow from the 0.5 GPM pump is insufficient to maintain cooling the 1.5 GPM pump is activated. The output 454 is connected through to the 1.5 GPM pump relay 165. The output for the 2 GPM pump is controlled by the fan control 104, the 2 GPM float 342 and the bake switch 278, and is connected to its relay 166.

Figure 13D:
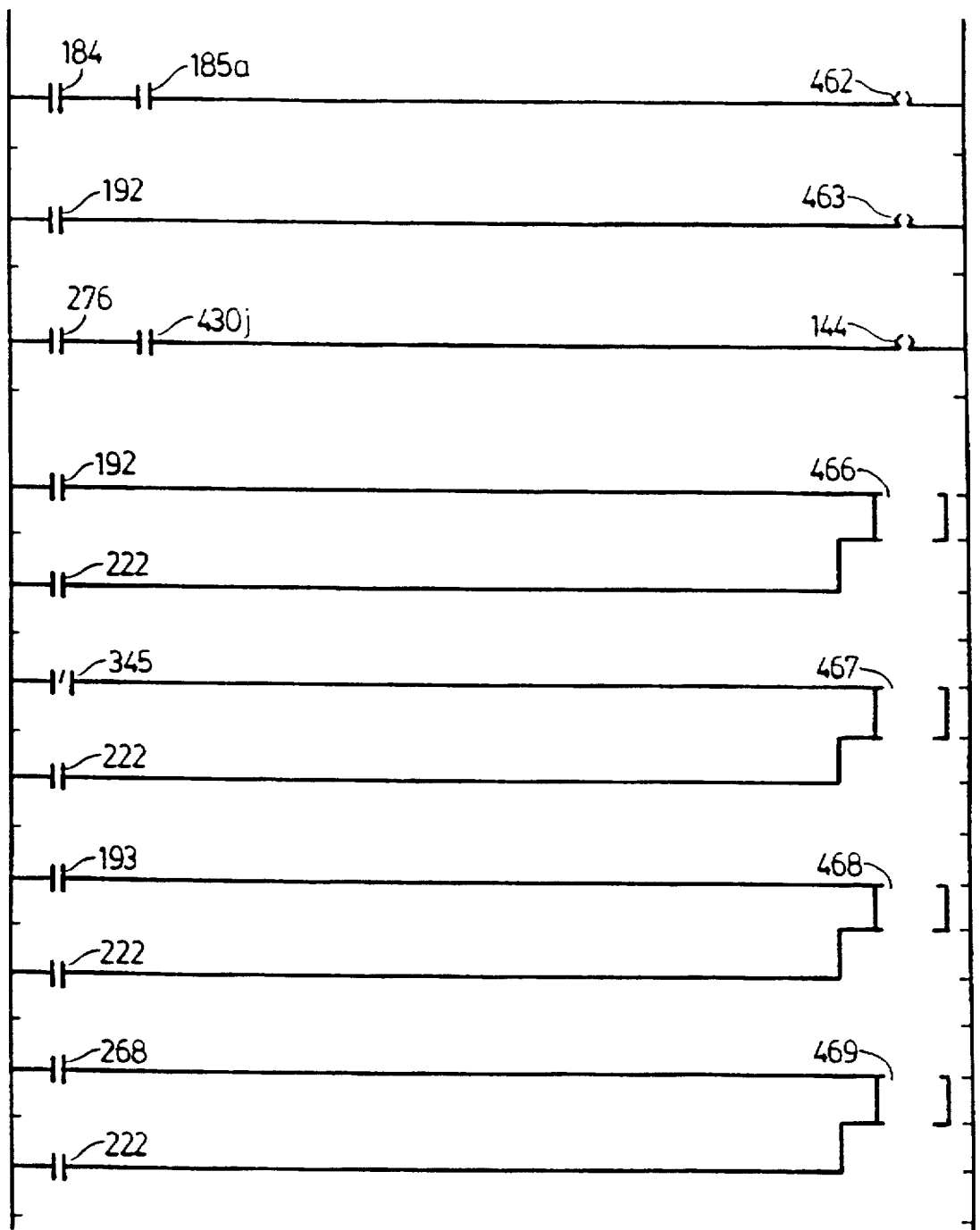

As shown, the fan control temperature switch 104 also controls a connection through the bake switch 250 to the bake timer indicated at 270. It also controls an output 458 to the fans 204. The snap disk 104 controls the timers 177, 178, which by means of contacts 177a and 178a control outputs 459 and 460 to the fans 208, 212. The refined fuel float switch 184 controls a timer 185. As shown at the top of FIG. 13d, this ensures that an output 462 to the refined fuel pump cannot go high until the end of the period set by timer 185. The auxiliary refined fuel float switch 192 is connected to a corresponding outlet 463, with both float switches 184, 192 being located on the refined fuel tank. The bake mode switch 276 to connected through a pair of latch contacts 430j to an outlet 144 for blower override.

FIG. 13d then shows a variety of logic units or latches 466, 467, 468 and 469, all of which can be reset by the start switch 222. These four units 466, 467, 468 and 469 are activated by, respectively, the auxiliary or refined fuel float switch 192, the high level float switch 345, the safety float switch 193 and the snap disc 268.

Figure 13E:
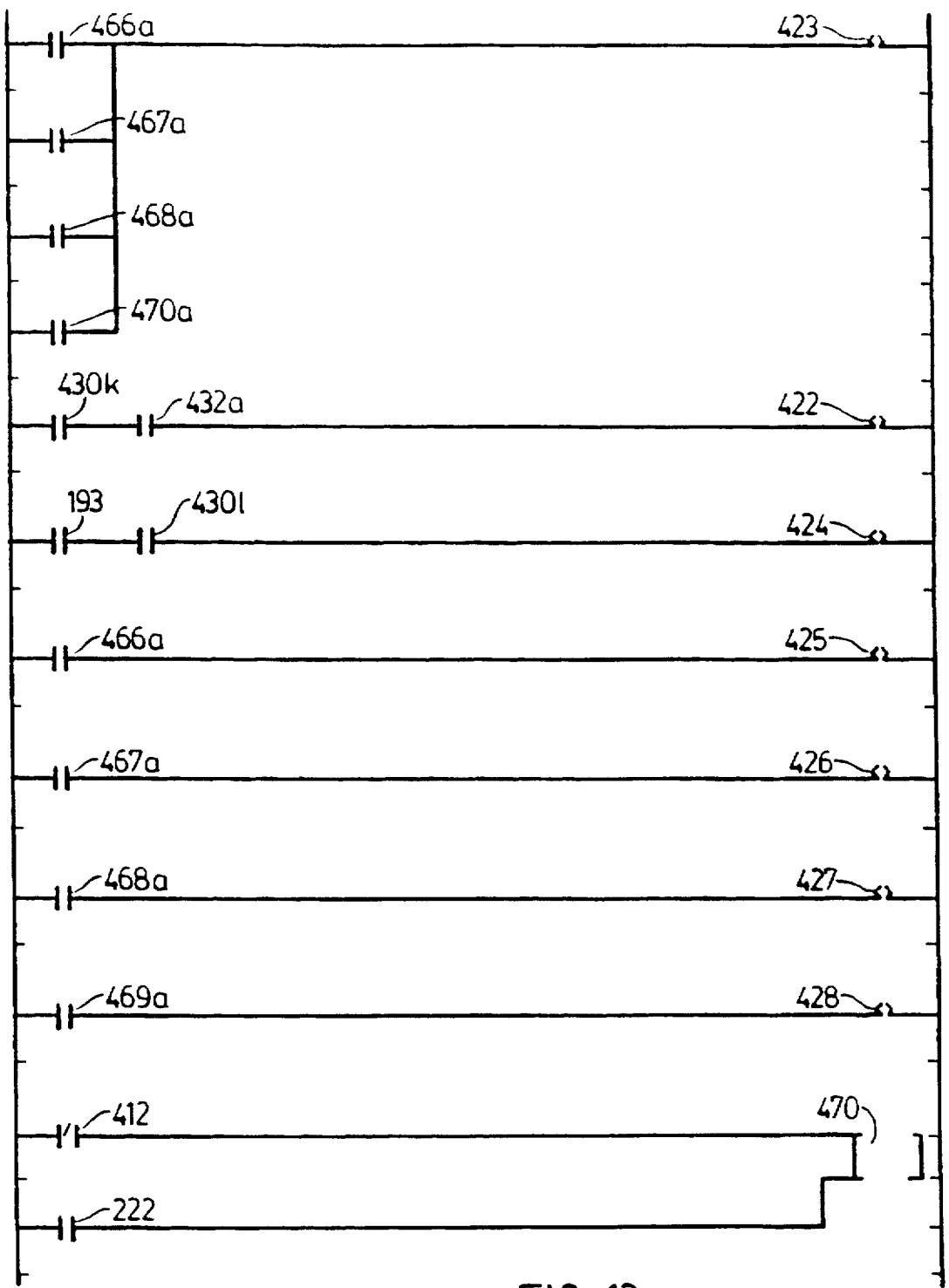
Figure 13F:
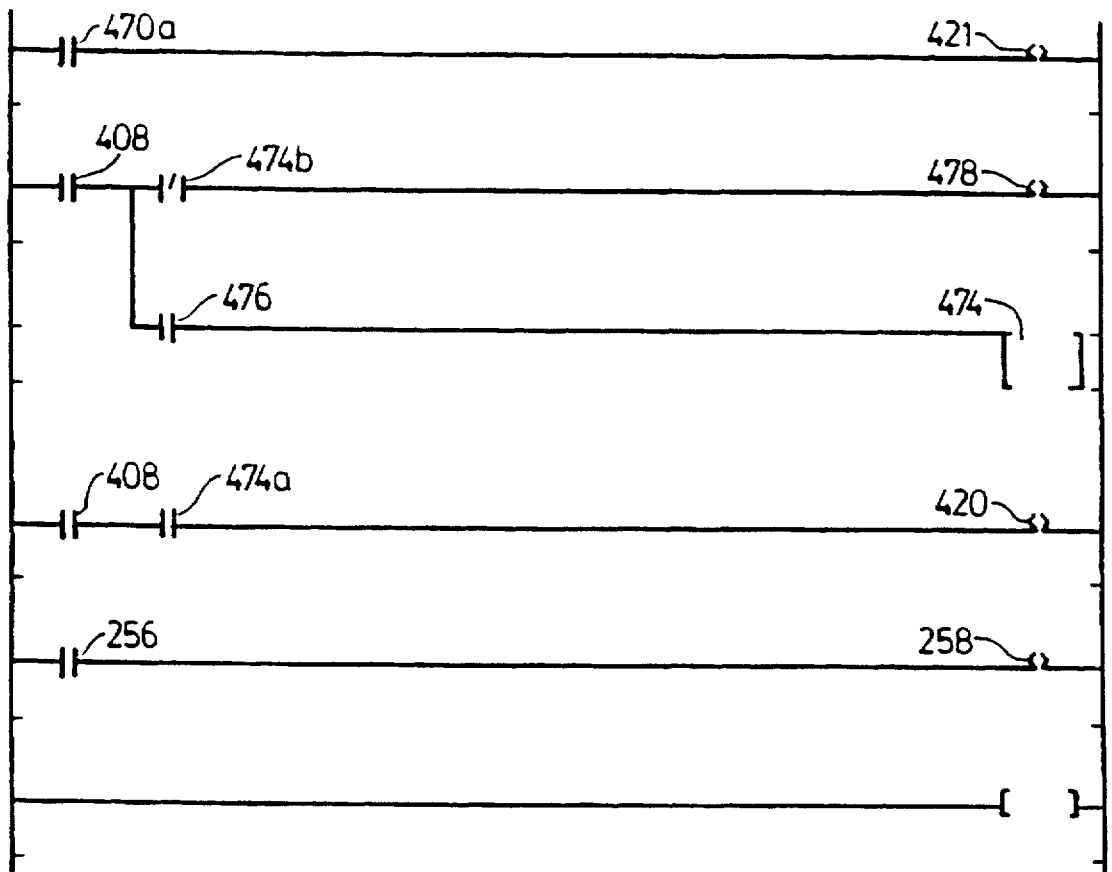

As shown on top of FIG. 13e, the contacts 466a, 467a and 468a, controlled by the respective latches, and also a latch or contact pair 470a of a further latch or logic unit 470 (described below) are connected in parallel to the amber fault trip light 423. Latch 430 also controls the contact pair 430k in series with contact pair 432a, and the supply pump lockout lamp 422. This provides an indication as to when the low level float switch has been activated and the supply pump has been locked out.

Similarly, a further contact pair 430l controls the connection between the safety float switch 193 and a lamp 424 indicative of excess refined fuel in the refined fuel recovery fuel tank. Contact pair 466a also activates the lamp 425 indicative of failure of the pump for removing refined fuel. When high level float switch 345 is activated, this closes contact pair 467a, illuminating lamp 426 indicating a high level condition.

When contact pair 468a is closed then lamp 427 is illuminated indicating that there is excess refined fluid fuel present. If the heat exchanger becomes too hot, then contacts 469a are closed, and lamp 428 is illuminated to indicate this.

The room temperature sensor 412 is connected to the logic or latch unit.470, which, as mentioned, closes contacts 470a when excess ambient or room temperature is detected. Again, this could be reset by the start switch 222. The contacts 470a also illuminate lamp 421, indicative of excess room temperature (FIG. 13).

A flare stack is provided connected to the output of the heat exchanger or condensation unit 4, to catch any non-condensed vapors. This is intended for flaring off light, volatile components, which could not be effectively condensed. Such components could emerge from the heat exchanger in vapor form, which could result in dangerous, explosive mixtures being formed in the atmosphere.

The flare or run switch 408, as shown in FIG. 12b, is connected through a normally closed contact pair 474b to an ignition solenoid and gas valve 478. Contact pair 474b is normally closed and is controlled by a timer 474 which, in turn, is connected through a flame detecting CAD cell 476. The timer 474 also controls another contact pair 474a, which is normally open and which is connected to the lamp 420, for indicating that the flame is present or in.

In use, on initial startup, no flame will be present, so that the CAD cell 476 will be open and the timer 474 not activated. Consequently, power will be supplied to the solenoid and ignition source 478. This will be connected to a suitable gas supply. With the valve open, the gas will be supplied and the ignition solenoid activated, to ignite the gas, to provide a pilot function. Once ignition has commenced, then the CAD cell 476 closes. The timer 474 then provides a predetermined time, for example, 30 seconds, to ensure that the flame is properly established. At the end of this time, the contacts 474b are opened, to cut off power to the ignition source 478, and simultaneously to close contact 474a. This results in lamp 420 being lit, to indicate that the pilot flame is present in the flare stack for burning any vapor present.

Finally, in this embodiment of the control system, the water float switch 256 has an output indicated at 258 actuating the relay 260 for activating the drainage pump motor 262, for removal of water. Although not shown, these components would be located beside the refiner fuel tank. As the water and condensed fuel do not form on emulsion, they can be separated.

A number of tests have been carried out using an apparatus functionally similar to that described above. Since these tests have been carried out, minor changes have been made to the apparatus, e.g. altering the configuration of the chamber 22 and condensation ducts and changes to the control circuitry. Fuel used was either number two fuel oil or a fuel oil, similar to diesel fuel, generated by the apparatus of my earlier application Ser. No. 246,834. Propane or other fuels could alternately be used. One reason for this is to ensure that the sludge does not become directly involved in the combustion process, which could result in the release of heavy metals into the atmosphere.

Initial testing was carried out by the Province of New Brunswick Research and Productivity Council.

During these tests, gases were monitored for: oxygen; carbon monoxide; oxides of nitrogen; carbon dioxide; and sulphur dioxide. Further, the flue gas temperature, smoke number, flue draft, relative humidity and ambient temperature were also recorded. A sample of the sludge inputted into the apparatus, a sample of the distillate or recovered oil and a sample of the residue left in the evaporation chamber 22 were retained for chemical analysis. The intention of this exercise was to determine whether or not metals originally found in the sludge had been concentrated in the solid residue left.

The chemical analysis consisted of the following:

Appearance, Odour, % water, % ash, % sulphur, % carbon, % hydrogen, % nitrogen, % oxygen (by difference, Gross heat of combustion (BTU/lb), Specific gravity @ 77°/77° F., and 60°/60° F., API gravity (calculated) Cloud point °F., Pour point °F., Flash point °F., Viscosity @ 40° C., 50° C., @100° C.-cSt.

Aluminum, Cadmium, Copper, Chromium, Iron, Lead, Molybdenum, Silicon, Sodium, Vanadium, Zinc b) Ash

| Aluminium | Iron | Rubidium |
| --- | --- | --- |
| Antimony | Lanthanum | Silver |
| Arsenic | Lead | Sodium |
| Barium | Lithium | Strontium |
| Bismuth | Magnesium | Tin |
| Boron | Manganese | Titanium |
| Cadmium | Molybdenum | Tungsten |
| Chromium | Nickel | Vanadium |
| Cobalt | Phosphorus | Yttrium |
| Copper | Potassium | Zinc |

The average results of the flue gas testing, i.e. the flue gases exiting through the exhaust opening 36 and associated stack are given in Table 1 below:

TABLE 1

Average Results of Flue Gas Testing

| CO (%) | $O_2$ (%) | $CO_2$ (%) | $SO_2$ (mm) | Mo (mm) | T steck (°F.) | T Ambient (°F.) |
|---|---|---|---|---|---|---|
| 0.043 | 10.990 | 7.766 | 61.5 | 13.8 | 744.3 | 72.3 |
| 0.058 | 10.891 | 7.723 | 59.7 | 15.8 | 799.7 | 67.9 |

| Smoke Number | Excess Air (%) | Efficiency (%) | Emissions (g/Kg Fuel) | | | |
|---|---|---|---|---|---|---|
| | | | CO | $SO_2$ | MO | S |
| 1 | 104.8 | 63.7 | 12.48 | 4.08 | 0.43 | 2.04 |
| 0.5 | 102.4 | 61.6 | 16.66 | 3.92 | 0.49 | 1.96 |

Chemical analysis of the sludges, ails and residues involved is given in the following table 2:

TABLE 2

Chemical Analyses of Sludges, Oils, and Solid Residues (ppm)

| | Sludge 1 | Refined Oil 2 | Refined Oil 3 | Refined Oil 4 | Refined Oil 5 | Refined Oil 6 | Solid Residue 7 | Sludge 8 |
|---|---|---|---|---|---|---|---|---|
| Al | 46.7 | <0.05 | 0.17 | <0.05 | 1 | 1 | 8200 | 223 |
| Cd | 3.38 | <0.05 | <0.05 | <0.05 | <0.05 | <0.05 | <100 | 7.0 |
| Cr | 14.6 | 0.73 | 0.28 | 0.22 | 0 | 1 | 400 | 27 |
| Cu | 141 | 0.04 | 0.09 | 0.07 | 1 | 1 | 2100 | 325 |
| Fe | 997 | 1.61 | 5.96 | 7.63 | <1 | <1 | 14100 | 1470 |
| Mo | 25.2 | <1.0 | <1.0 | <1.0 | <1 | 2 | 500 | 365 |
| Ma | 580 | 4.00 | 6.21 | 1.43 | 23.5 | 8.5 | 37100 | 1125 |
| Pb | 1079 | 0.63 | 1.28 | 0.63 | <1 | <1 | 6700 | 4775 |
| Si | 0.01 | <0.01 | <0.01 | <0.01 | 5 | 7 | N.D. | 112 |
| V | <4 | 42 | <4 | <4 | <10 | <10 | 100 | <10 |
| Zn | 3101 | 0.64 | 0.62 | 0.18 | 1.9 | 1.35 | 47400 | 9240 |
| Ag | — | — | — | — | — | — | <100 | 105.6 |
| As | — | — | — | — | — | — | <5 | 164 |
| S | — | — | — | — | — | — | 275 | <2 |
| Sa | — | — | — | — | — | — | 300 | 48 |
| Si | — | — | — | — | — | — | <100 | 4 |
| Co | — | — | — | — | — | — | <100 | <2 |
| K | — | — | — | — | — | — | 3800 | 4660 |
| La | — | — | — | — | — | — | Not Avail | 9 |
| Li | — | — | — | — | — | — | <100 | 124 |
| Mg | — | — | — | — | — | — | 25500 | 77200 |
| Mn | — | — | — | — | — | — | 9400 | 14090 |
| Mi | — | — | — | — | — | — | 1200 | 116 |
| P | — | — | — | — | — | — | 43500 | 126700 |
| Rb | — | — | — | — | — | — | <100 | <200 |
| Sb | — | — | — | — | — | — | <200 | 167 |
| Sr | — | — | — | — | — | — | <200 | 50 |
| Sn | — | — | — | — | — | — | 4000 | 222 |
| Ti | — | — | — | — | — | — | 300 | 71 |
| W | — | — | — | — | — | — | <500 | 788 |
| Y | — | — | — | — | — | — | <100 | 2 |

1. Sludge feedstock from current test program
2. Refined oil from current test program, generated at RPC
3. Refined oil from sludge (1) - submitted by client after RPC tests
4. Refined oil (not from Sludge 1) from sludge refiner, run through waste oil reconditioning furnace
5. Refined oil from waste oil reconditioning furnace - RPC report ICAS/87/407, 1988 - submitted by client
6. Refined oil from waste oil reconditioning furnace - RPC report ICAS/87/407, 1988 - generated at RPC
7. Solid, cake-like residue from current test program
8. Sludge from waste oil reconditioning furnace (associated with 6) - RPC report ICAS/87/407, 1988 generated at RPC Further, the following Table 3 gives the physical properties of these sludges and oils involved in the tests:

TABLE 3

PHYSICAL PROPERTIES OF SLUDGES AND OILS

| PARAMETER | SLUDGE 1 | REFINED OIL 2 | REFINED OIL 3 |
|---|---|---|---|
| APEARANCE | black with particulates | dark brown with particulates | murky brown with particulates |
| ODOUR | light odour of oil or fuel | strong, unpleasant odor | extremely pungent |
| WATER (%) | 0.24 | 0.16 | 0.08 |
| ASH (%) | 2.47 | <0.05 | <0.05 |
| SULPHUR (%) | 0.70 | 0.26 | 0.37 |
| CARBON (%) | 83.02 | 84.75 | 84.15 |
| HYDROGEN (%) | 14.26 | 14.62 | 14.68 |
| NITROGEN (%) | 0.14 | 0.18 | 0.08 |
| OXYGEN (%) by diff. | <0.05 | 0.19 | 0.72 |
| Gross Heat of Combustion (BTU/lb) | 18963 | 19592 | 19512 |
| Specific Gravity: | | | |
| @77°/77° F. | 0.9048 | 0.8606 | 0.8459 |
| @60°/60° F. | 0.9088 | 0.8646 | 0.8499 |
| API Gravity (calc) | 24.2 | 32.2 | 35.0 |
| Cloud Point (°F.) | N/A | N/A | N/A |
| Pour Point (°F.) | −20 | −12 | −22 |
| Flash Point (°F.)** | +108 | +8 | −12 |
| Viscosity: | | | |
| @40° C. (cSt) | 78.26 | 12.19 | 7.525 |
| @50° C. (cSt) | 49.59 | 9.083 | 5.875 |
| @100° C. (cSt) | 12.76 | 3.003 | 2.238 |

| PARAMETER | REFINED OIL 4 | REFINED OIL 5 | REFINED OIL 6 |
|---|---|---|---|
| APEARANCE | clear, brown with particulates | clear, fluores. yellow-orange mobile liquid | clear, fluores. yellow-orange mobile liquid |
| ODOUR | extremely pungent | acrid, penetrating | acrid, penetrating |
| WATER (%) | 0.22 | 0.15 | <0.05 |
| ASH (%) | <0.05 | <0.01 | <0.01 |
| SULPHUR (%) | 0.44 | 0.24 | 0.20 |
| CARBON (%) | 85.00 | 83.74 | 84.62 |
| HYDROGEN (%) | 14.83 | 13.04 | 13.27 |
| NITROGEN (%) | 0.08 | 0.04 | 0.05 |
| OXYGEN (%) by diff. | <0.05 | 2.79 | 1.81 |
| Gross Heat of Combustion (BTU/lb) | 19496 | 19550 | 19548 |
| Specific Gravity: | | | |
| @77°/77° F. | 0.8479 | 0.8550 | 0.8525 |
| @60°/60° F. | 0.8519 | 0.8590 | 0.8565 |
| API Gravity (calc) | 34.6 | 32.2 | 33.7 |
| Cloud Point (°F.) | N/A | T.D. | T.D. |
| Pour Point (°F.) | <−25 | −5 | −5 |
| Flash Point (°F.)** | +3 | 85 | 95 |
| Viscosity: | | | |
| @40° C. (cSt) | 3.027 | 7.54 | 7.42 |
| @50° C. (cSt) | 2.510 | 5.77 | 5.69 |
| @100° C. (cSt) | 1.206 | 2.23 | 2.18 |

| PARAMETER | SLUDGE 8 | TYPICAL COMMERCIAL DIESEL/FURNACE OIL |
|---|---|---|
| APEARANCE | opaque, black viscous liquid | clear, yellow-orange mobile liquid |
| ODOUR | acrid, penetrating | characteristic, penetrating |
| WATER (%) | 0.05 | 0.05 |
| ASH (%) | 7.12 | <0.01 |
| SULPHUR (%) | 1.02 | 0.16 |
| CARBON (%) | 81.76 | 82.84 |
| HYDROGEN (%) | 11.75 | 13.06 |
| NITROGEN (%) | 0.28 | 0.03 |
| OXYGEN (%) by diff | (−1.98)* | 3.91 |
| Gross Heat of | 17957 | 19614 |

TABLE 3-continued

PHYSICAL PROPERTIES OF SLUDGES AND OILS

Combustion (BTU/lb)
Specific Gravity:

| | | |
|---|---|---|
| @77°/77° F. | 0.9650 | 0.8190 |
| @60°/60° F. | 0.9690 | 0.8230 |
| API Gravity (calc) | 14.55 | 40.45 |
| Cloud Point (°F.) | T.D. | −34 |
| Pour Point (°F.) | +10 | −40 |
| Flash Point (°F.)** | >220 | 100 (min) |
| Viscosity: | | |
| @40° C. (cSt) | 251.5 | — |
| @50° C. (cSt) | 156.4 | 1.5 |
| @100° C. (cSt) | 25.14 | — |

N/A = Not Applicable
T/D = Too dark to observe
*The ash is very high for an oil sample and the ash components would be present as oxides, thereby seriously skewing the equation used to obtain "oxygen by difference"
**Pensky-Martens Closed Cup With regard to the designations used, Sludge 1 refers to the sludge used during this test, whilst sludge 8 refers to a sludge generated by use of the apparatus of my earlier application Ser. No. 246,834, which had been previously analyzed. Comparison of the two indicates some significant differences. Sludge 8 contains significantly higher levels of aluminum (4.8 times) molybdenum (14.5 times) and lead (4.4 times) than sludge 1. Other metals were found at higher concentrations as well.

Refined oils 2 and 3 were produced from sludge 1, with oil 2 being produced by an independent research organization (the Research and Productivity Council at New Brunswick, Canada) and oil 3 being produced by the applicant. The metal concentrations in oil 2 are 1.5 and 4 times lower than in oil 3. Oil 4 was refined oil produced by the sludge refining apparatus of the present invention and then run through the waste oil conditioning furnace of my earlier application Ser. No. 246,834. This shows that, perhaps not surprisingly, there is no significant reduction in metal levels occurring as a result of this extra processing; in effect, since the metals are removed to a significant extend by the first processing step, then additional processing has not effect. However, bear in mind that refined oil 4 was derived from sludge 1, and so a direct comparison is not possible.

The data for oils 5 and 6 were generated by a previous test program, i.e. they are carried out on oils generated by the apparatus of my earlier invention. This shows that oils 2, 3 and 4 are all generally similar with oils 5 and 6.

A comparison of sludges 1 and 8 shows that the current sludge contains less ash and sulphur than the previous sludge, at the same time its calorific value is higher, whilst its specific gravity and viscosity are lower than those of sludge 8.

Refined oils 2 and 3 give very similar properties, although both the specific gravity and the viscosity was somewhat higher in the former case. Refined oil 4, which is not derived from sludge 1, also yielded similar characteristics, with the exception of its appearance. It was a clear, brown liquid with particulates whilst oils 2 and 3 were dark brown and murky brown, respectively, with particulates. This can no doubt be accounted for by the fact that oil 4 was further processed by the apparatus of my earlier invention.

With regard to the flue gases, CSA standard B140.0, general requirements for oil burning equipment, requires that the level of carbon monoxide in the flue gas not exceed an 0.04% by volume. The levels generated by the apparatus of the present invention measured, on average not 0.051%. It must be realized however that the CSA recommended level is intended for oil burner testing. This number is related to performance rather than environmental considerations. By adjusting the burner to minimize the formation of carbon monoxide, it should be possible to reduce the emissions below the current levels. It should also be realized that this standard is a Canadian standard, and other standards would apply in other jurisdictions, and this comment applies to a number of the parameters discussed below. For oxygen and carbon dioxide the values obtained, namely 10.9% and 7.7% respectively are considered reasonable for the type of burner employed. These levels correspond to an average calculated excess air of 104%. The levels recorded for S02 and NO namely 61 ppm and 15 ppm are considered normal and give no particular problem.

The total flue gas temperature of 702° F. was within the limits set by CSA standard B104.4 oil fired warm air furnaces, clause 7.2.1.4.2. This stipulates that the maximum flue gas temperature should be between 300° and 750° F. Whilst the value recorded is high it is within the limits.

All of the refined oils, whether produced by the apparatus of the present invention, my earlier apparatus, or a combination of the two, showed results which were consistent. The only significant difference was in the area of appearance with those oils derived from my earlier apparatus demonstrating a clarity not found in the dark or murky brown oils from the present apparatus.

The distillate or recovered oil produced by my apparatus compares favourably to commercial light fuel oils with respect to their elemental compositions and calorific values. However, there are differences in the areas of viscosity and specific gravity (the values being higher for the distillate or recovered oil), and pour points/flash points. this can be attributed to the fact that commercial light fuels consist of saturated paraffinic aliphatic hydrocarbons, with a narrower range of boiling points, while the distillate analyzed possessed a mixture of saturated and unsaturated aliphatic paraffinic hydrocarbons, with a very wide range of boiling points.

With regard to the solid residue that is left behind, the apparatus concentrates this into a cake-like residue, with a composition given in table 2. Conceivably, with the solid material so-concentrated, it would become both more economic and feasible to process this. In particular, it is envisaged that it could be processed to recover the metals contained in it.

As discussed below, other tests have determined that this ash cake is a toxic non-leachate, so that it could be disposed or used by, for example, combining it in asphalt.

The solid material produced by the apparatus contains recoverable amounts of zinc, phosphorous, magnesium, calcium and lead. The strategic metal molybdenum is present at around 8.2 pounds per ton. Accordingly, this black, cake-like solid is suitable for reprocessing. The only disadvantage is that when processing waste lubricating oil and the like, the solids represent a relatively small amount of the oil. Consequently, a typical installation would generate approximately a truck load of solid material in one year. In large urban areas where there could be a requirement for a large number of apparatus or refiners in accordance with the present invention and my earlier invention to operate, it is anticipated that it would prove feasible to operate a central collection facility for collecting and further processing the solid waste from the present apparatus.

A further series of tests as carried out (by OCL Services Ltd. of Dartmouth, Nova Scotia, Canada) with a general objective of determining if operation of the apparatus would generate emissions having a serious environmental impact. As detailed below, the tests started with a waste oil which meet current Waste Oil Regulations, at least in Canada, and found that the process generated only one end-product waste stream which could possibly be classified as an environmental hazard. This was an ash cake solid waste from the apparatus of the present invention. It was further determined that this ash cake is not leachable, and hence, could be classified as toxic non-leachate, as detailed below.

The following table 4 shows the analysis of the initial product, listing a typical waste oil:

TABLE 4

Analysis of Initial Raw Product

| Item | Value | Units |
|---|---|---|
| PCB (as Aroclor 1260) | <1 | mg/kg |
| Arsenic | <0.05 | mg/kg |
| Lead | 20.8 | mg/kg |
| Cadmium | 0.46 | mg/kg |
| Chromium | 1.4 | mg/kg |
| Zinc | 757 | mg/kg |
| Sediment, toluene fraction | 4.21 | % |
| Ash | 0.56 | % |
| Organic chloride | 382 | mg/kg |
| Pinsky-Martens Flash Point; boils @ | 100 | °C. |
| Water content (side arm) | 3.0 | % |
| Specific Gravity @ 60° F. | 0.8860 | — |
| Sulphur | 0.56 | % |
| Odour | solvent (possibly varsol) | |

| Distillation | | | |
|---|---|---|---|
| Initial BP: 100° C. | 10% (188° C.) | 20% (280° C.) | 30% (310° C.) |
| | 40% (321° C.) | 50% (327° C.) | 60% (328° C.) |
| | 70% (328° C.) | 80% (324° C.) | 90% (320° C.) |
| | end point reached at 328° C. with 60% recovered | | |

A comparison of this analysis with Waste Oil Environmental Criteria (Canadian Standards) shows that the oil meets the environmental criteria in all respects. The concentration of PCBs was less than 1 mg/kg (Criterion equals 5 mg/kg). Concentrations of the metals were low and also met the relevant criteria.

Tables 5 shows an analysis of the residual solids or ash cake produced by the apparatus. As shown, the cake was analyzed for 5 trace metals. As expected, the metal contaminants in the original feedstock were concentrated in the ash cake residue, particularly the lead and zinc. Concentrations were high, and in all likelihood, the ash could be considered a hazardous

TABLE 5

Residual Solids Analysis

| Item | Ash Cake #1 | Ash Cake #2 | Centrifuge Sludge #1 | Units |
|---|---|---|---|---|
| Arsenic | 2.50 | 0.19 | 0.34 | mg/kg |
| Lead | 1160 | 747 | <1.5 | mg/kg |
| Cadmium | 32.2 | 27.8 | <0.20 | mg/kg |
| Chromium | 110 | 87.2 | <0.50 | mg/kg |
| Zinc | 35,900 | 61,728 | 0.64 | mg/kg |

Accordingly, a standard leachate test, as defined in the Canadian Transport of Dangerous Goods Act was carried out. These results are shown in table 6.

TABLE 6

Leachate Test of Ash Cakes

| Item | Ash Cake #1 | Ash Cake #2 | Leachate Criteria | Units |
|---|---|---|---|---|
| pH | 4.10 | 4.05 | — | — |
| Arsenic | <0.005 | <0.005 | 5.0 | mg/L |
| Lead | <0.30 | <0.30 | 5.0 | mg/L |
| Cadmium | <0.01 | <0.1 | 5.0 | mg/L |
| Chromium | <0.10 | <0.10 | 0.50 | mg/L |
| Zinc | 1.8 | 1.9 | no value | mg/L |

The leachate results are well within the criteria of that Act, and hence the material can be classified as a non-toxic leachate.

It can be noted that the trace metal content in the ash cake will be a function of the feed stock and accordingly, there are likely to be significant differences depending upon the raw oil input.

Table 7 shows a different product analysis.

TABLE 7

REFINED PRODUCT ANAYLSIS

| Item | Pre-Processed Oil Test #1 † (1674-6) | Pre-Processed Oil Test #2 ‡ (1674-1) | Units |
|---|---|---|---|
| Flash Point | 94.0 | <0.111 | °C. |
| Viscosity @ 20° C. | 11.8 | 5.25 | centistoke |
| Calorific Value | 19,228 | 19,547 | Btu/lb |
| Elemental Analysis | | | |
| H | 12.85 | 12.57 | % |
| C | 86.62 | 86.27 | % |
| N | 0.06 | 0.01 | % |
| O | 0.42 | 1.09 | % |
| S | 0.29 | 0.32 | % |
| Ash @ 775° C. | <0.005 | <0.005 | % |
| Arsenic | 0.21 | 0.25 | mg/kg |
| Lead | <1.0 | 2.0 | mg/kg |
| Chromium | <1.0 | <1.0 | mg/kg |
| Cadmium | <0.2 | <0.2 | mg/kg |
| Zinc | — | <0.2 | mg/kg |
| Colour (D1500/96 ASTM) | <3.0 oil | 4.0 oil | — |
| Burning carbon residue | 0.051 | 0.045 | % |
| Pour point | −16 | −21 | °C. |
| Odour | burnt | burnt | — |
| PCB (as Aroclor 1260) | <1 | 4.8 | mg/kg |
| Total organic chlorides | <60 | 338 | mg/kg |
| Water content | <0.05 | <0.05 | % |
| Distillation Range | | | |
| initial BP | 200 | 60 | °C. |
| 10 mL | 236 | 162 | °C. |

TABLE 7-continued

REFINED PRODUCT ANAYLSIS

| Item | Pre-Processed Oil Test #1 † (1674-6) | Pre-Processed Oil Test #2 ‡ (1674-1) | Units |
|---|---|---|---|
| 20 mL | 267 | 205 | °C. |
| 30 mL | 294 | 244 | °C. |
| 40 mL | 315 | 284 | °C. |
| 50 mL | 331 | 315 | °C. |
| final BP | 331 | 328 | °C. |
| recovery | 63.0 | 61.0 | % |

† test #1 represents material centrifuged and adjusted for flash point
‡ test #2 represents material only centrifuged. Result for flash point shows result before and after flash point adjustment.

Test No. 1 shows the material that was subsequently centrifuged and adjusted, by the applicant, as it was realised that the oil had a relatively low flash point. This gave a flash point of 94° C. Test No. 2 shows oil which was just centrifuged, without flash point adjustment. The flash point was then adjusted. Two flash point Figures are given, before and after adjustment, showing an increase in flash point from less than 0° C. to 111° C. Environmentally, this is of no great significance, but it does affect the classification of the oil and conditions under which it would have to be transported.

The sludge by-product generated by centrifuging was also tested and met relevant environment criteria. This sludge could be input back into the apparatus for further processing.

The characteristics of the oil set out in table 7 is equivalent to a no. 4 or 5 fuel oil, in accordance with ASTM Standards, and accordingly, this product could be used as such.

Alternatively, as detailed in my co-pending application, filed simultaneously herewith, for an apparatus and method for reclaiming waste oil, the output from the present apparatus could be further processed in that apparatus, to generate an oil equivalent to a diesel fuel oil. The contents of that other application are hereby incorporated by reference.

It can be noted that the concentrations of metals and other contaminants are low in the recovered oil.

During testing, the output of the stack or exhaust was monitored. It was shown that the CO emissions were low, indicating high burner efficiency.

Preferably, the relays, etc., of the control circuit are replaced by a programmable logic controller (PLC). Such a PLC is an OMRON C60, and there follows a list of operating instructions for that PLC:

<<<SI-402-BO WAST OIL REFINING SYSTEM REV: 1.24 BY SUSSEX MFG. LIMITED >>>

| ADDRESS | AMEMONIC | | OPERAND | COMMENT | NOTE |
|---|---|---|---|---|---|
| 00000 | LD | | | 00002 UNIT RUN | |
| 00001 | LD | NOT | | 00003 ES PS NC | |
| 00002 | OR | | | 00211 130 FLT TMK | |
| 00003 | OR | NOT | | 00212 ROOMTEMP | |
| 00004 | OR | | | 00213 AUX REF NO | |
| 00005 | OR | NOT | | 00203 NLFS | |
| 00006 | KEEP | | | 00303 | |
| 00007 | LD | | | 00004 LLFS | |
| 00008 | LD | | | 00307 BLO OVERRIDE | |
| 00009 | OR | | | 00005 SUPPLY PUMP RES | |
| 00010 | KEEP | | MR 0006 | | |
| 00011 | LD | | | 00303 SAFE IR | |
| 00012 | AND | NOT | | 00008 SP LB KEY SWITCH | |
| 00013 | AND | NOT | MR 0006 | SPLY LB MR | |
| 00014 | AND | NOT | | 00006 FAN CONTROL | |
| 00015 | OUT | | | 00100 SP OUT | |
| 00016 | LD | NOT | | 00006 FAN CONTROL | |
| 00017 | OR | | | 00007 SAIL SH | |
| 00018 | AND | | | 00303 SAFE IR | |
| 00019 | LD | | | 00004 LLFS | |
| 00020 | OR | | | 00015 BAKE SH | |
| 00021 | AND | LD | | | |
| 00022 | AND | | | 00000 SP LO KEY SWITCH | |
| 00023 | AND | | MR 0006 | SPLY LB MR | |
| 00024 | AND | NOT | | 00009 L130 | |
| 00025 | AND | | | 00011 SURGE FLOAT | |
| 00026 | AND | NOT | | 00012 FLOW CONTROL | |
| 00027 | AND | | | 00207 BAKE TIMER IN | |
| 00028 | AND | NOT | | 00209 FLOW DKU | |
| 00029 | AND | | | 00204 TEMP CONTROL | |
| 00030 | AND | NOT | MR 0008 | PRESSURE CONTROL | |
| 00031 | BUT | | | 00112 HORN BURN | |
| 00032 | LD | NOT | | 00006 FAN CONTROL | |
| 00033 | OR | | | 00007 SAIL SM. | |
| 00034 | AND | | | 00303 SAFE IR | |
| 00035 | LD | | | 00004 LLFS | |
| 00036 | OR | | | 00015 BAKE SW | |
| 00037 | AND | LD | | | |
| 00038 | AND | | | 00008 SP LO KEY SWITCH | |
| 00039 | AND | | MR 0006 | SPLY LO MR | |
| 00040 | AND | NOT | | 00009 L130 | |
| 00041 | AND | | | 00011 SURGE FLOAT | |
| 00042 | AND | | | 00207 BAKE TIMER IN | |
| 00043 | AND | NOT | | 00209 FLOW BKD | |
| 00044 | AND | | | 00204 TEMP CONTROL | |
| 00045 | AND | NOT | MR 0006 | PRESSURE CONTROL | |
| 00046 | AND | | TIR 003 | FLOW TIMER | |
| 00047 | OUT | | | 00113 FLOW OUT | |
| 00048 | LD | | | 00112 NORM BURN | |
| 00049 | OR | | | 00113 FLOW OUT | |
| 00050 | AND | | | 00303 SAFE IR | |
| 00051 | OUT | | | 00102 BURN OUT | |
| 00052 | LD | | | 00012 FLOW CONTROL | |
| 00053 | OR | | | 00209 BLOW BKU | |
| 00054 | AND | NOT | TIN 002 | | |
| 00055 | TIN | | 003 | | |
| | | | # 0200 | | |
| 00056 | LD | | TIN 003 | FLOW TIMER | |
| 00057 | TIN | | 002 | | |
| | | | # 0020 | | |
| 00058 | LD | | | 00215 PRESSURE SWITCH | |
| 00059 | LD | | TIN 005 | PRESSURE TIMER | |
| 00060 | KEEP | | MR 0000 | | |
| 00061 | LD | | | 00303 SAFE IR | |
| 00062 | AND | | MR 0008 | PRESSURE CONTROL | |
| 00063 | TIN | | 005 | | |
| | | | # 0100 | | |
| 00064 | LD | | | 00303 SAFE IR | |
| 00065 | AND | | | 00014 1/2 OPN FS | |
| 00066 | AND | | | 00013 TC ALARM | |
| 00067 | AND | | MR 0006 | SPLY LO MR | |
| 00068 | AND | NOT | | 00015 BAKE SW | |
| 00069 | BUT | | | 00103 1/2 OPN OUT | |
| 00070 | LD | | | 00303 SAFE IR | |
| 00071 | AND | | | 00006 FAM CONTROL | |
| 00072 | AND | | | 00200 1.4 OPN PUMP | |
| 00073 | LD | | | 00303 SAFE IR | |
| 00074 | AND | | | 00210 ST 130 | |
| 00075 | AND | | | 00014 1/2 OPN FS | |
| 00076 | OR | LD | | | |
| 00077 | AND | NOT | | 00015 BAKE SW | |
| 00078 | BUT | | | 00104 1.5 OPN | |
| 00079 | LD | | | 00303 SAFE IR | |
| 00080 | AND | | | 00006 FAM CONTROL | |
| 00081 | AND | | | 00201 26PN FLT | |
| 00082 | AND | NOT | | 00015 BAKE SW | |
| 00083 | BUT | | | 00105 26PN OUT | |

<<<SI-402-BO WAST OIL REFINING SYSTEM REV: 1.24 BY SUSSEX MFG. LIMITED >>>

| ADDRESS | AMEMONIC | | OPERAND | COMMENT | NOTE |
|---|---|---|---|---|---|
| 00084 | LD | | 00303 | SAFE IR | |
| 00085 | AND | NOT | 00006 | FAM CONTROL | |
| 00086 | AND | | 00015 | BAKE SW | |
| 00087 | OUT | | 00106 | BAKE TIMER START | |
| 00088 | LD | | 00006 | FAN CONTROL | |
| 00089 | OUT | | 00100 | FANS 1&2 | |
| 00090 | LD | | 00006 | FAN CONTROL | |
| 00091 | TIN | | 006 | | |
| | | | # 0030 | | |
| 00092 | LD | | TIN 006 | | |
| 00093 | OUT | | 00110 | FANS 3&4 | |
| 00094 | LD | | 00006 | FAN CONTROL | |
| 00095 | TIN | | 007 | | |
| | | | # 0060 | | |
| 00096 | LD | | TIN 007 | | |
| 00097 | OUT | | 00109 | FANS 5&6 | |
| 00098 | LD | | 00205 | REF FLT | |
| 00099 | TIN | | 004 | | |
| | | | # 0450 | | |
| 00100 | LD | | 00205 | REF FLT | |
| 00101 | AND | | TIN 004 | REF BEL | |
| 00102 | OUT | | 00111 | REFINED PN OUT | |
| 00103 | LD | | 00213 | AUX REF NO | |
| 00104 | OUT | | 00300 | AUX REF OUT | |
| 00105 | LD | | 00200 | BAKE TMP | |
| 00106 | AND | | 00303 | SAFE IR | |
| 00107 | OUT | | 00307 | BLD OVERRIDE | |
| 00108 | LD | | 00213 | AUX REF NO | |
| 00109 | LD | | 00002 | UNIT RUN | |
| 00110 | KEEP | | MR 0001 | | |
| 00111 | LD | NOT | 00203 | NLFS | |
| 00112 | LD | | 00002 | UNIT RUN | |
| 00113 | KEEP | | MR 0002 | | |
| 00114 | LD | | 00209 | FLOW BKN | |
| 00115 | LD | | 00002 | UNIT RUN | |
| 00116 | KEEP | | MR 0002 | | |
| 00117 | LD | | 00210 | ST 130 | |
| 00118 | LD | | 00002 | UNIT RUN | |
| 00119 | KEEP | | MR 0004 | | |
| 00120 | LD | | MR 0001 | REF FAIL | |
| 00121 | DR | | MR 0002 | ML STAT | |
| 00122 | DR | | MR 0003 | FLOW BKU | |
| 00123 | DR | | MR 0010 | | |
| 00124 | OUT | | 00310 | AMBER FAULT TRIP | |
| 00125 | LD | | 00303 | SAFE IR | |
| 00126 | AND | | MR 0006 | SPLY LO MR | |
| 00127 | OUT | | 00311 | FLMR PL | |
| 00128 | LD | | 00209 | FLOW BKU | |
| 00129 | AND | | 00303 | SAFE IR | |
| 00130 | OUT | | 00311 | FLMR PL | |
| 00131 | LD | | MR 0001 | REF FAIL | |
| 00132 | OUT | | 00312 | REF FAIL | |
| 00133 | LD | | MR 0002 | ML STAT | |
| 00134 | OUT | | 00313 | MLF PL | |
| 00135 | LD | | MR 0003 | FLOW BKU | |
| 00136 | OUT | | 00314 | FLKU PL | |
| 00137 | LD | | MR 0004 | L 130 HEAT EXCH | |
| 00138 | OUT | | 00315 | HEAT EXCH NOT | |
| 00139 | LD | NOT | 00212 | ROOMTEMP | |
| 00140 | LD | | 00002 | UNIT RUN | |
| 00141 | KEEP | | MR 0010 | | |
| 00142 | LD | | MR 0010 | | |
| 00143 | OUT | | 00306 | | |
| 00144 | LD | | 00202 | FLAR RUN | |
| 00145 | OUT | TR | 0 | | |
| 00146 | AND | NOT | TIN 020 | OFF TIN | |
| 00147 | BUT | | 00101 | ING SV | |
| 00148 | LD | TR | 0 | | |
| 00149 | AND | | 00000 | CAB 24V | |
| 00150 | TIN | | 020 | | |
| | | | # 0300 | | |
| 00151 | LD | | 00202 | FLAR RUN | |
| 00152 | AND | | TIN 020 | OFF TIN | |
| 00153 | OUT | | 00107 | FLAN IN | |
| 00154 | LD | | 00206 | WATER FLOAT | |
| 00155 | OUT | | 00309 | MAT OUT | |
| 00156 | END | | | | |

I claim:

1. An apparatus for reclaiming a useful oil product from a waste oil, the apparatus comprising: an evaporation chamber, including an inlet for the waste oil, and an outlet for vaporized oil, as a useful oil product; heating means for heating the evaporation chamber to vaporize oil from the waste oil; level monitoring means for monitoring the level of the waste oil in the evaporation chamber and including a first switch means; pump means connected to the inlet of the evaporation chamber for pumping waste oil into the evaporation chamber, and connected to and controlled by the level monitoring means, to maintain the waste oil level in the evaporation chamber at a desired level; and a control circuit connected to and controlling the heating means and the pump means, wherein the first switch means is connected in the control circuit for controlling the pump means and for disabling the heating means if a desired oil level is not present in the evaporation chamber, and the control circuit includes a bake override switch means for overriding operation of the first switch means and enabling continued operation of the heating means in a bake mode with the waste oil below the desired level, thereby to enable vaporisation of substantially all residual waste oil in the evaporation chamber.

2. An apparatus as claimed in claim 1, wherein the heating means burns fuel and air to generate heat and exhaust gases, and wherein the apparatus includes an evaporation unit including the evaporation chamber, which evaporation unit comprises a housing, in which the evaporation chamber and the heating means are mounted, which housing includes an exhaust opening for exhaust gases from the heating means.

3. An apparatus as claimed in claim 2, wherein the evaporation chamber is spaced from walls of the housing to permit free circulation of hot exhaust gases around the evaporation chamber.

4. An apparatus as claimed in claim 2, wherein the evaporation chamber is spaced from the walls of the housing, and wherein the housing includes an end wall and an access door is provided in that end wall extending through to the evaporation chamber, to provide access to the interior of the evaporation chamber for removing solids therefrom.

5. An apparatus as claimed in claim 3 or 4, wherein the heating means comprises two burners located within the housing below the evaporation chamber, at either end thereof, and a temperature controller in the control circuit for controlling the burners to maintain a desired temperature within the evaporation chamber.

6. An apparatus as claimed in claim 2, which further includes a condensation unit connected to the outlet of the evaporation chamber and having an outlet for condensed, recovered oil, and a collection tank for recovered oil to which the outlet of the condensation unit is connected.

7. An apparatus as claimed in claim 6, wherein the condensation unit comprises a plurality of layers of ducts providing an elongate path for the vaporized oil and an extended heat transfer surface, a condensation unit housing enclosing at least some of the ducts, and fans mounted on the condensation unit housing for moving air through the condensation unit housing and over the ducts to remove heat from the vaporized oil and condense the oil.

8. An apparatus as claimed in claim 7, wherein the level monitoring means includes a float switch means, which comprises a low level safety switch on the evaporation chamber, for maintaining a minimum level of waste oil within the evaporation chamber and for disabling the heating means if the desired oil level is not present, and a collection safety float switch on the collection tank for preventing overfilling of the collection tank, the safety float switches being connected in the control circuit.

9. An apparatus as claimed in claim 7, wherein the level monitoring means includes a first switch means which includes a plurality of pump switches for sensing the level in the evaporation chamber and activating the pump means to maintain the waste oil level in the evaporation chamber between desired upper and lower limits.

10. An apparatus as claimed in claim 7, wherein the heating-means comprises at least one burner located within the housing below the evaporation chamber, which burner includes a burner fan for supplying combustion air thereto, and wherein the control circuit includes a burner circuit for controlling each burner and including a temperature controller for controlling each burner to maintain a desired temperature within the evaporation chamber.

11. An apparatus as claimed in claim 7, wherein the fans are mounted on top of the condensation unit housing.

12. An apparatus as claimed in claim 10, wherein the first switch means includes a low level safety switch means in the burner circuit, for opening the burner circuit if the level of waste oil in the evaporation chamber exceeds desired upper and lower limits, a first temperature sensor on the condensation unit for opening the burner circuit if a predetermined temperature is exceeded, and a pressure sensor on the evaporation unit for sensing pressure in the evaporation unit, indicative of excess flow conditions, and for opening the burner circuit when such condition is detected, wherein the bake override switch means is capable of overriding the low level safety switch means of the burner circuit for enabling the bake mode.

13. An apparatus as claimed in claim 12, which includes flow control switch means mounted on the condensation unit for detecting excess flow therethrough, which flow control switch means is connected in the burner circuit and interrupts operation of each burner to reduce the output of the evaporation chamber, to permit the excess flow to clear the condensation unit.

14. An apparatus as claimed in claim 13, wherein the flow control switch means includes timer means for setting first and second periods which alternate with one another, with the heating means only permitted to operate during the first set period.

15. An apparatus as claimed in claim 13, which includes a supply pump, wherein the low level safety switch means includes a low level switch mounted to sense waste oil level in the evaporation chamber for detecting a minimum level therein and connected in the control circuit and to the supply pump for operation thereof, supply pump lockout means connected to the low level switch, for locking out the supply pump and enabling the burner circuit, once that minimum level has been reached, and at least two operating pumps for maintaining the operating level within the evaporation chamber, the operating pumps being of different capacity, and two corresponding pump switches for activating the operating pumps, which pump switches are mounted to sense the waste oil level in the evaporation chamber and are connected in the control circuit, with the switch for the operating pump of lesser capacity being located above each switch for each pump of greater capacity.

16. An apparatus as claimed in claim 1 or 15, wherein the bake override switch means is connected in the control circuit for interrupting power supply to the pump means to prevent further supply of waste oil to the evaporation chamber, to permit continuous operation of the burners in the bake mode.

17. An apparatus as claimed in claim 16, which includes a bake timer, a second temperature sensor on the condensation unit connected to the bake timer, and with the bake override switch means being connected to the bake timer, whereby-after operation of the bake override switch means, the bake timer is activated once the temperature of the heat exchanger falls below a predetermined temperature, indicating that substantially all of the volatile contents of the evaporation chamber have been volatized, the bake timer interrupting the burner circuit and maintaining operation of the burner fan, for a predetermined time, to effect cooling of the evaporation chamber.

18. An apparatus as claimed in claim 17, which includes a collection switch on the collection tank for sensing a level of recovered oil, a high level safety switch mounted for monitoring the level of oil within the evaporation chamber, temperature sensing means for sensing at least one temperature on or adjacent the apparatus, and fault-interrupt and indication means, connected to the collection and high level safety switches and the temperature sensing means, and connected into the control circuits for interrupting operation of the apparatus and providing a fault condition if any of those parameters exceeds a predetermined limit.

19. A method of reclaiming a useful oil product from a waste oil, the method comprising the steps of:

(1) heating waste oil in an evaporation chamber, to vaporize oil therefrom, and recovering vaporized oil as a useful oil product;

(2) continuously supplying waste oil to the evaporation chamber, until concentration of solid material in the evaporation chamber builds up to form a sludge in which solids are concentrated; and (3) after a period of time heating the sludge in a bake mode, the sludge being heated to a temperature higher than in step (1) to vaporise substantially all residual waste oil, to leave a solid residue;

(4) after residual waste oil has been vaporised, disposing of the solid residue.

20. A method as claimed in claim 19, wherein during step (1) the temperature is controlled, to maintain the interior of the evaporation chamber at a desired temperature.

21. A method as claimed in claim 20, which includes the following additional step:

(5) after step (2) and (3), condensing recovered oil.

22. A method as claimed in claim 21, wherein step (1) is carried out in an evaporation chamber that is entirely closed, and wherein step (5) is carried out in a closed condensation unit, and wherein the evaporation chamber includes access doors permitting access to the evaporation chamber.

23. A method as claimed in claim 21, wherein the recovered oil is condensed by passing it through ducts presenting an extended heat transfer surface and cooling the ducts with air by means of fans.

24. A method as claimed in claim 21, wherein the waste oil in step (1) is heated by way of burners, wherein the temperature of the waste oil is monitored, and the operation of the burners is regulated to maintain the waste oil temperature within desired limits.

25. A method as claimed in claim 24, wherein the temperature of the oil during condensation is monitored, and the method is controlled in dependence upon that monitored temperature.

26. A method as claimed in claim 23, wherein the flow of oil through the ducts and the flow of air over the ducts are essentially concurrent.

27. A method as claimed in claim 23, wherein condensed, recovered oil is collected in a recovered oil tank.

28. A method as claimed in claim 22, wherein a level of waste oil in the evaporation chamber and a level of recovered oil in the recovered oil tank are monitored, with the method being interrupted if the waste oil level in the evaporation chamber exceeds a predetermined upper limit or falls below a predetermined lower limit, or if the level of oil in the recovered oil tank exceeds an upper limit.

29. A method as claimed in claim 23 wherein a level of waste oil in the evaporation chamber is monitored and the recovered oil is collected in a recovered oil tank, with a level of recovered oil in the recovered oil tank being monitored, the method being interrupted if the waste oil level goes outside predetermined upper or lower limits, or if the recovered oil level exceeds an upper limit, and wherein the temperature in the evaporation chamber is monitored during step (1) and the heat to the evaporation chamber is cut off if this temperature exceeds a predetermined value, and wherein the temperature of the ducts for condensation is monitored and the fans are maintained operative whilst that temperature exceeds a predetermined value.

30. A method as claimed in claim 19, 22 or 29 wherein during step (1) the evaporation chamber is heated to a first temperature, and during step (3) the evaporation chamber is heated to a second, higher temperature to substantially eliminate volatile material from the evaporation chamber.

31. A method as claimed in claim 19, 22 or 29, when applied to sludge produced from a method of treating waste oil in which waste oil is heated to vaporized hydrocarbons and thereby to leave heavier hydrocarbons and solid contaminants as the sludge.

32. A method as claimed in claim 19, wherein, in step (1), waste oil is heated to a temperature such as to cause cracking of the oil, to generate a useful oil product which is lighter than the original waste oil.

33. A method as claimed in claim 32, wherein the waste oil comprises waste crankcase oil, and the conditions in step (1) are selected to generate a useful oil product having the characteristics of a fuel oil.

* * * * *